United States Patent
Mathis

(10) Patent No.: US 9,579,679 B2
(45) Date of Patent: Feb. 28, 2017

(54) AIRCRAFT COATING APPLICATION SYSTEM AND METHOD

(71) Applicant: The Boeing Company, Chicago, IL (US)

(72) Inventor: Dennis R. Mathis, Charleston, SC (US)

(73) Assignee: The Boeing Company, Chicago, IL (US)

( * ) Notice: Subject to any disclaimer, the term of this patent is extended or adjusted under 35 U.S.C. 154(b) by 64 days.

(21) Appl. No.: 14/289,471

(22) Filed: May 28, 2014

(65) Prior Publication Data

US 2015/0343473 A1    Dec. 3, 2015

(51) Int. Cl.
| | |
|---|---|
| B25J 5/02 | (2006.01) |
| B05B 13/04 | (2006.01) |
| B05B 13/02 | (2006.01) |
| B64F 5/00 | (2006.01) |
| B05B 13/00 | (2006.01) |
| B05B 3/02 | (2006.01) |
| B05B 12/02 | (2006.01) |
| B25J 11/00 | (2006.01) |
| B25J 5/04 | (2006.01) |

(52) U.S. Cl.
CPC .............. *B05B 13/005* (2013.01); *B05B 3/02* (2013.01); *B05B 12/02* (2013.01); *B05B 13/0431* (2013.01); *B25J 5/04* (2013.01); *B25J 11/0075* (2013.01); *B64F 5/009* (2013.01); *B64F 5/0018* (2013.01); *B64F 5/0036* (2013.01); *B64F 5/0081* (2013.01); *Y10S 901/43* (2013.01)

(58) Field of Classification Search
None
See application file for complete search history.

(56) References Cited

U.S. PATENT DOCUMENTS

| | | | | |
|---|---|---|---|---|
| 3,460,177 A | | 8/1969 | Rhinehart et al. | |
| 3,601,832 A | * | 8/1971 | Cook | B64F 5/0018 15/141.1 |
| 3,612,075 A | * | 10/1971 | Cook | B64F 5/0063 134/103.2 |
| 4,654,087 A | * | 3/1987 | Fujita | B64F 5/0018 134/25.4 |
| 4,658,485 A | * | 4/1987 | Yang | B24B 7/005 451/340 |
| 4,702,661 A | * | 10/1987 | Bisiach | B60B 17/0055 212/326 |
| 5,248,341 A | * | 9/1993 | Berry, Jr. | B05B 13/0431 118/323 |

(Continued)

FOREIGN PATENT DOCUMENTS

EP    0455371    11/1991

OTHER PUBLICATIONS

Extended European Search Report, EP15169442, dated Oct. 2, 2015.

*Primary Examiner* — Binu Thomas

(57) ABSTRACT

A coating application system may include a pair of towers movable along a respective pair of floor tracks. A crossbeam may extend between the pair of towers. The cross beam may have opposing beam ends. A universal joint may couple each beam end to a tower to allow the crossbeam to rotate about a vertical axis and about a horizontal axis. A robotic device may be mounted to the crossbeam. The robotic device may include an end effector for performing one or more operations on an aircraft exterior surface.

21 Claims, 24 Drawing Sheets

(56) References Cited

U.S. PATENT DOCUMENTS

| | | | |
|---|---|---|---|
| 6,068,216 A * | 5/2000 | Prins | B64F 5/0063 |
| | | | 244/134 C |
| 7,350,890 B2 | 4/2008 | Baird et al. | |
| 8,088,450 B2 | 1/2012 | Swanberg et al. | |
| 8,455,054 B2 | 6/2013 | Brewer et al. | |
| 2009/0067962 A1 * | 3/2009 | Lee | B65G 47/80 |
| | | | 414/331.11 |
| 2010/0025349 A1 * | 2/2010 | Khoshnevis | B05B 13/04 |
| | | | 212/324 |

* cited by examiner

FIG. 1

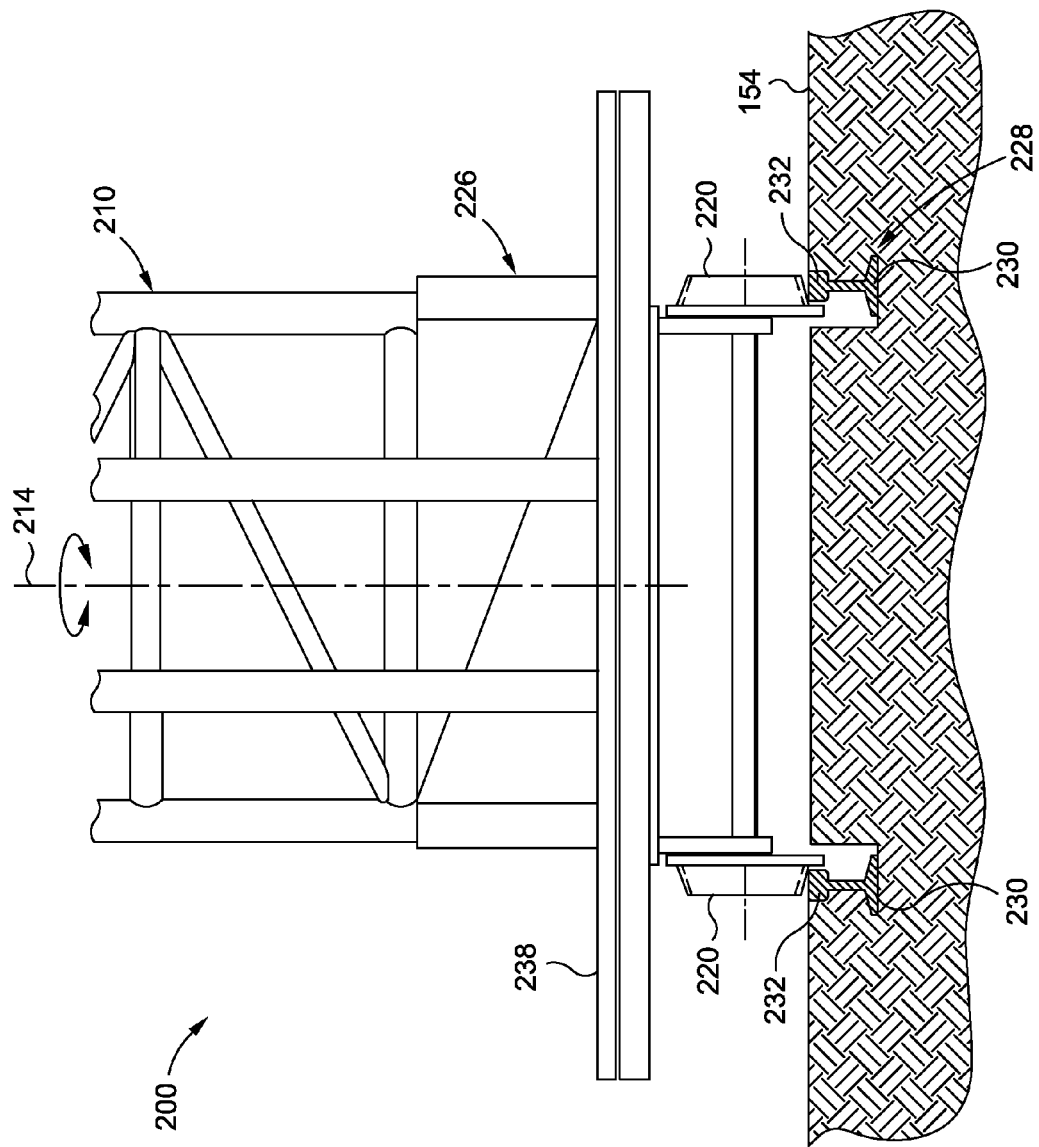

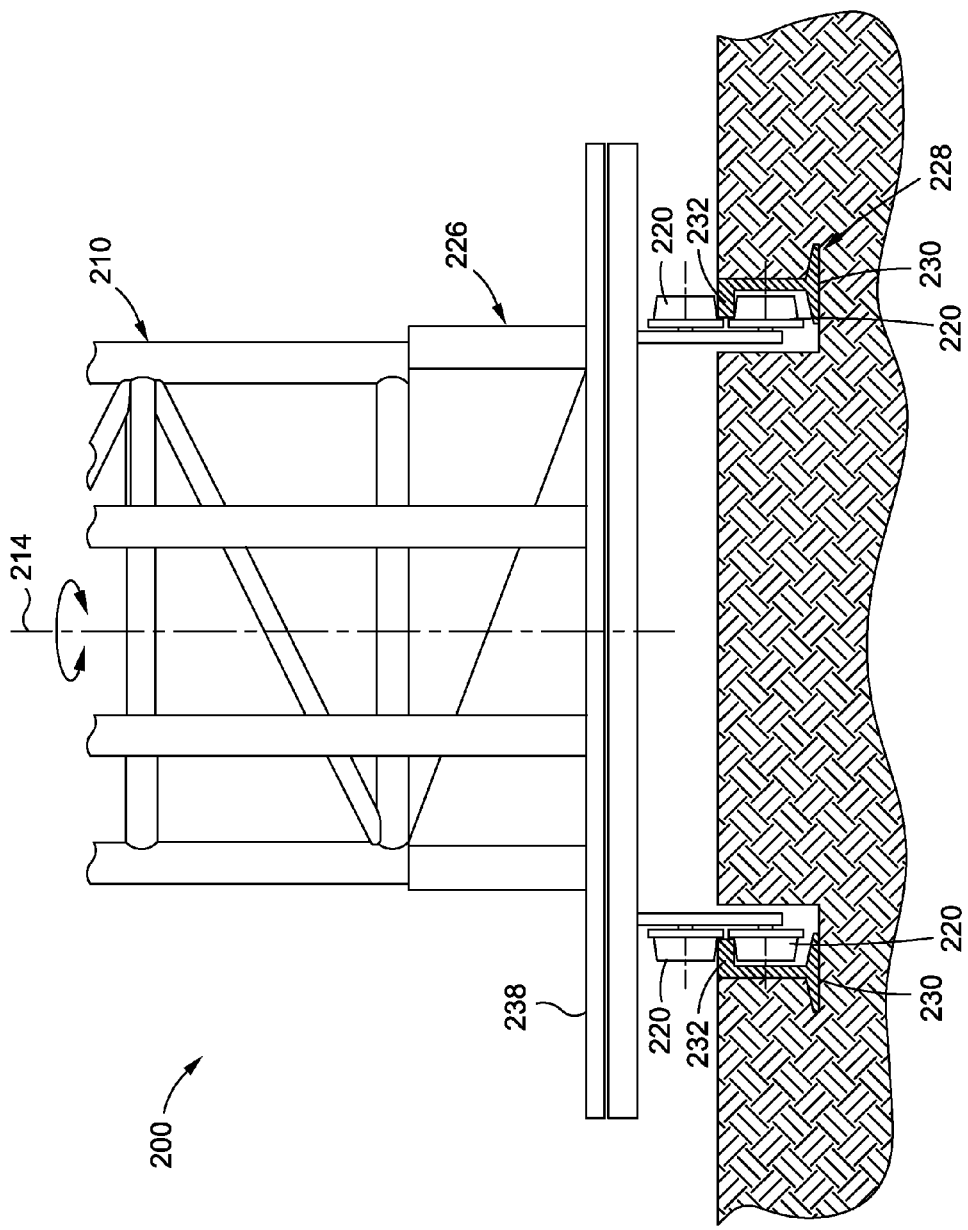

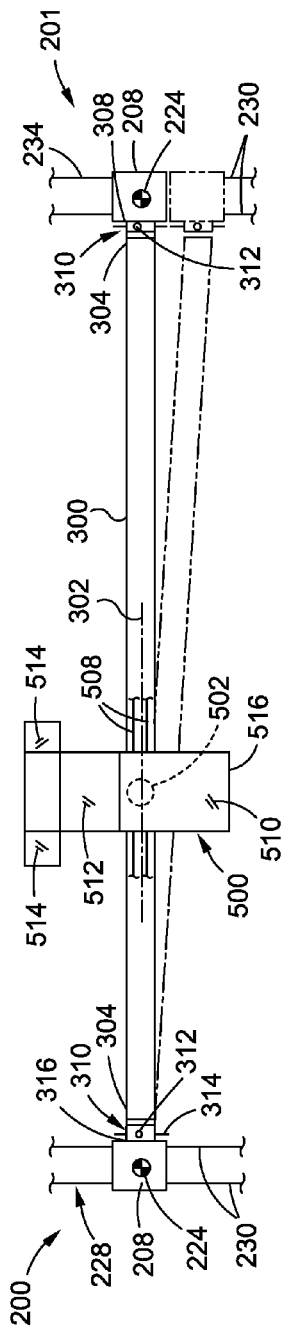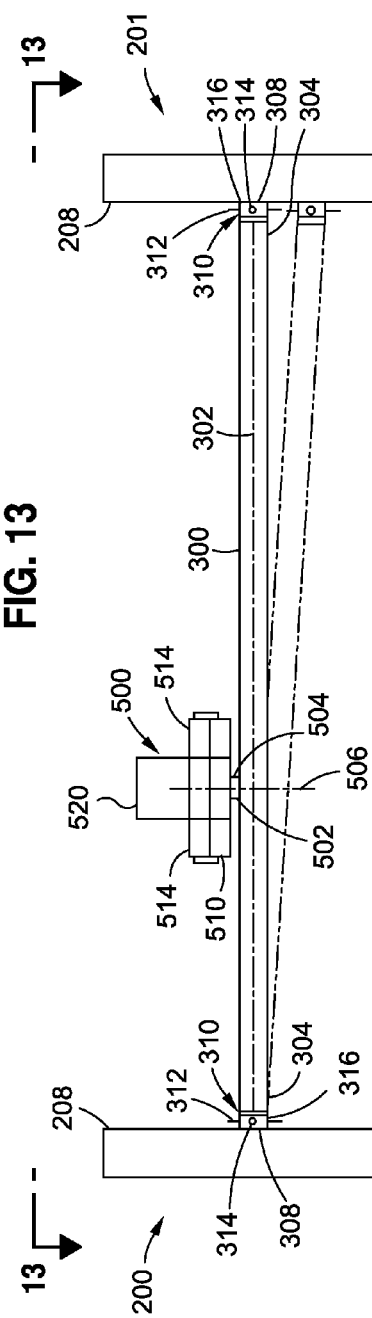
FIG. 13
FIG. 12

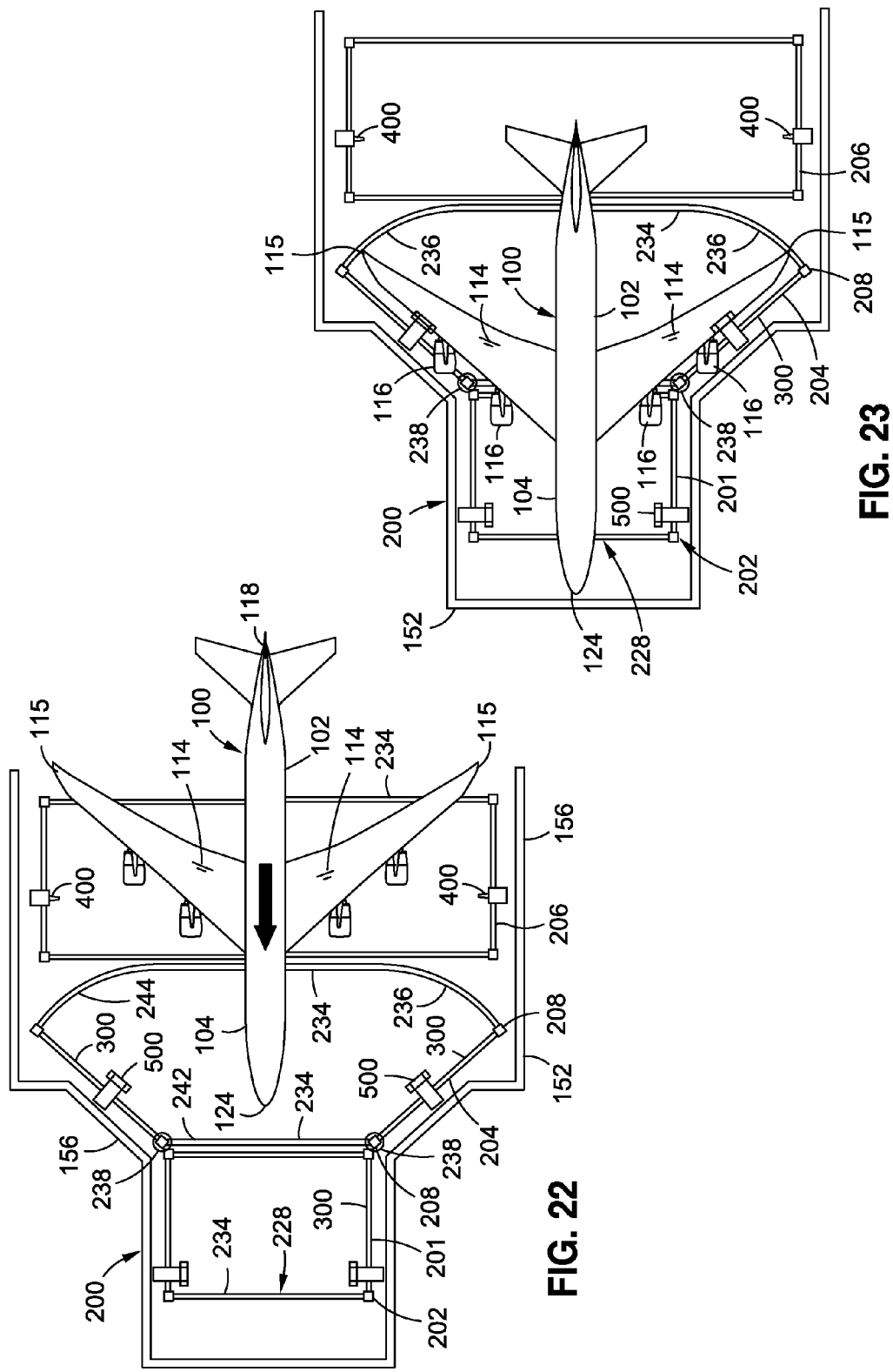

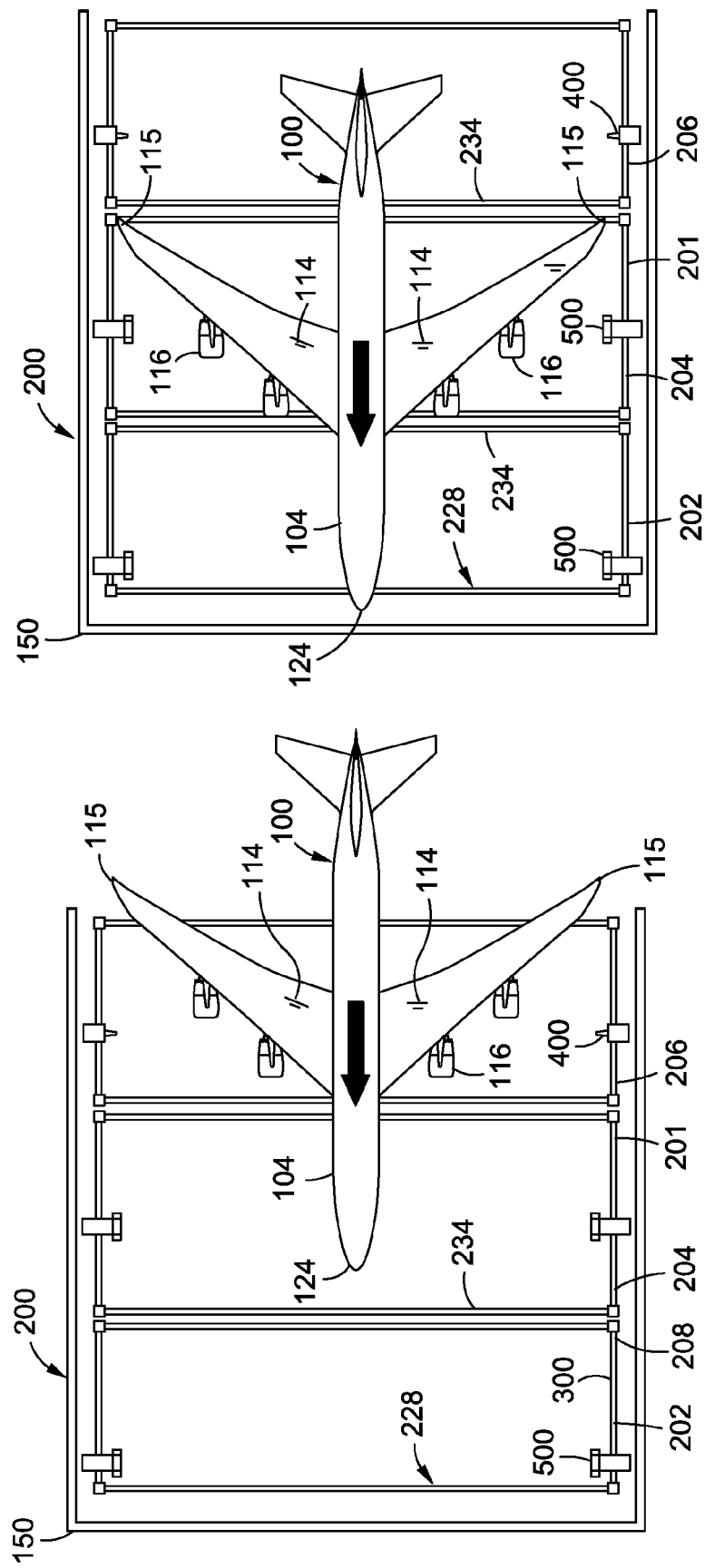

AIRCRAFT COATING APPLICATION SYSTEM AND METHOD

FIELD

The present disclosure relates generally to coating application systems and, more particularly, to a system and method of processing the exterior surfaces of an aircraft.

BACKGROUND

The painting of an aircraft is a relatively challenging and time-consuming process due to the wide range of dimensions and unique geometry associated with aircraft. For example, the wings extending outwardly from the fuselage present geometry that can interfere with the painting process. The height of the vertical tail above the horizontal tail can present challenges in accessing the exterior surfaces of the vertical tail. In this regard, the process of painting an aircraft may require access by personnel to the aircraft exterior surfaces for manual operations such as sanding, cleaning, and masking of the surfaces prior to the application of one or more coatings of primer and paint, followed by de-masking and inspection of the aircraft surfaces.

The application of coatings to aircraft exterior surfaces must also be performed in a precise manner. For example, the process of applying paint to the aircraft surfaces must be carried out with a high level of control to ensure an acceptable level of coating thickness to meet performance requirements and visual expectations. The process of painting is further challenged by the large amount of exterior surface area of an aircraft.

As can be seen, there exists a need in the art for a system and method for applying a coating to an aircraft that can be accurately performed in a relatively low-cost manner and in a reduced amount of time.

SUMMARY

The above-noted needs associated with applying coatings to aircraft are addressed by the present disclosure which provides a gantry-based coating application system. The coating application system may include at least one gantry having a pair of towers that may be movable along a respective pair of floor tracks. A crossbeam may extend between a pair of towers. The cross beam may have opposing beam ends. A universal joint may couple each beam end to a tower to allow the crossbeam to rotate about a vertical axis and about a horizontal axis of the universal joint. A robotic device may be mounted to the crossbeam. The robotic device may include an end effector for performing one or more operations on an aircraft exterior surface.

In a further embodiment, disclosed is a coating application system for coating an exterior surface of an aircraft. As indicated above, the coating application system may include at least one gantry. The gantry may include a first and second tower movable along a respective first and second floor track oriented generally parallel to one another. The gantry may additionally include a crossbeam extending between the first and second tower, and at least one robotic device having an end effector configured to perform one or more operations on an aircraft exterior surface. The coating application system may also include a turntable associated with an outboard end of the first floor track. The turntable may be configured to rotate the first tower about a first tower axis. The coating application system may additionally include a curved track section associated with an outboard end of the second track. The curved track section may allow the second tower to move along an arc having a center of curvature located at the first tower axis such that the crossbeam may pivot relative to a wingtip of the aircraft.

Also disclosed is a coating application method for an aircraft. The method may include positioning at least one gantry relative to an aircraft. The gantry may include a crossbeam extending between a pair of towers engaged to respective floor tracks. The method may include moving the pair of towers in a coordinated manner along the floor tracks to position the gantry at a desired location relative to the aircraft. The method may additionally include operating a robotic device mounted to the crossbeam and having an end effector, and performing one or more operations on an aircraft exterior surface. One or more operations may be performed using the end effector and/or one or more operations may be manually performed by technicians supported on a personnel platform mounted to the crossbeam.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of a coating application system as may be implemented for coating an aircraft;

FIG. 6 is a side view of an embodiment of a tower base having a set of wheels in rolling engagement to a parallel pair of floor tracks;

FIG. 7 is a side view of a further embodiment of the floor track system having upper and lower wheels capturing a track flange of each one of the floor tracks;

FIG. 12 is a side view of an embodiment of a gantry illustrating the universal joints allowing for lagging vertical movement of one of the beam ends relative to an opposite beam end during vertical movement of the crossbeam;

FIG. 13 is a top view of gantry of FIG. 12 and illustrating the universal joints allowing for lagging horizontal movement of one of towers relative to an opposite tower during horizontal movement of the towers along the floor track system;

FIGS. 22-25 are schematic plan views of a process for loading an aircraft between a set of gantries of a coating application system installed in a T-hanger;

FIGS. 26-29 are schematic plan views of a process for loading an aircraft between a set of gantries of a coating application system installed in a rectangular hanger;

DETAILED DESCRIPTION

Figure 1:
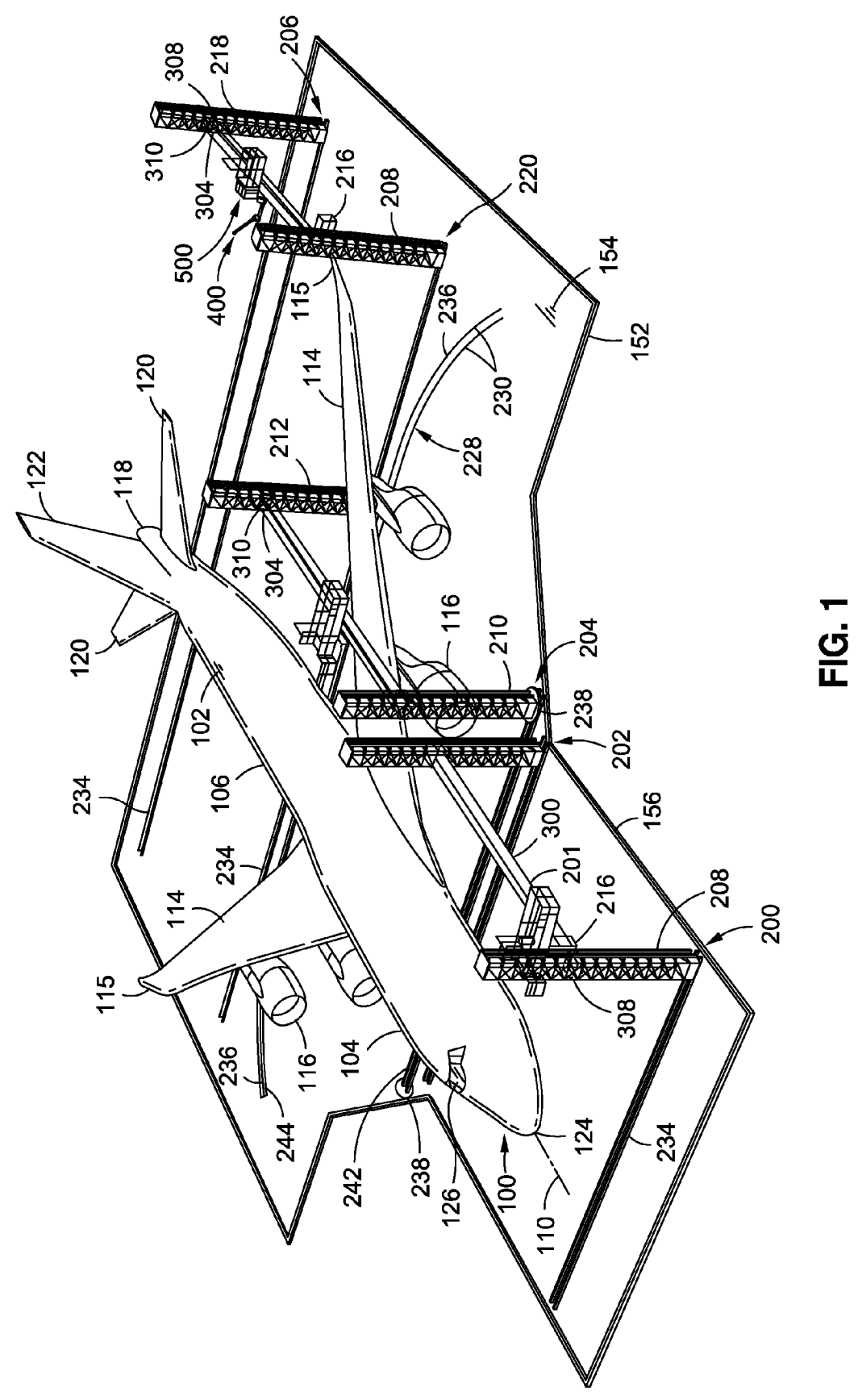
Figure 2:
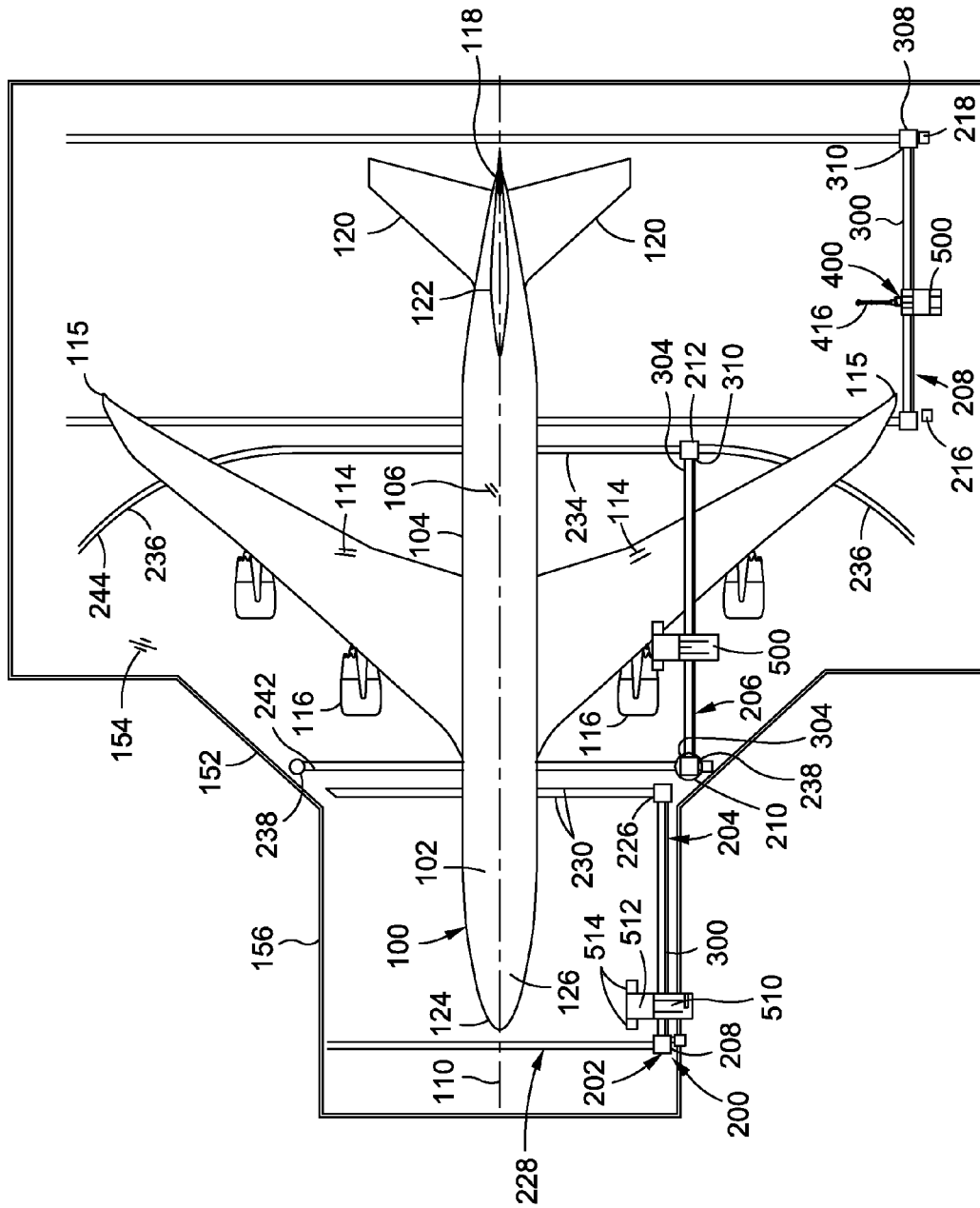
FIG. 2 is a top view of the coating application system of FIG. 1.
Figure 3:
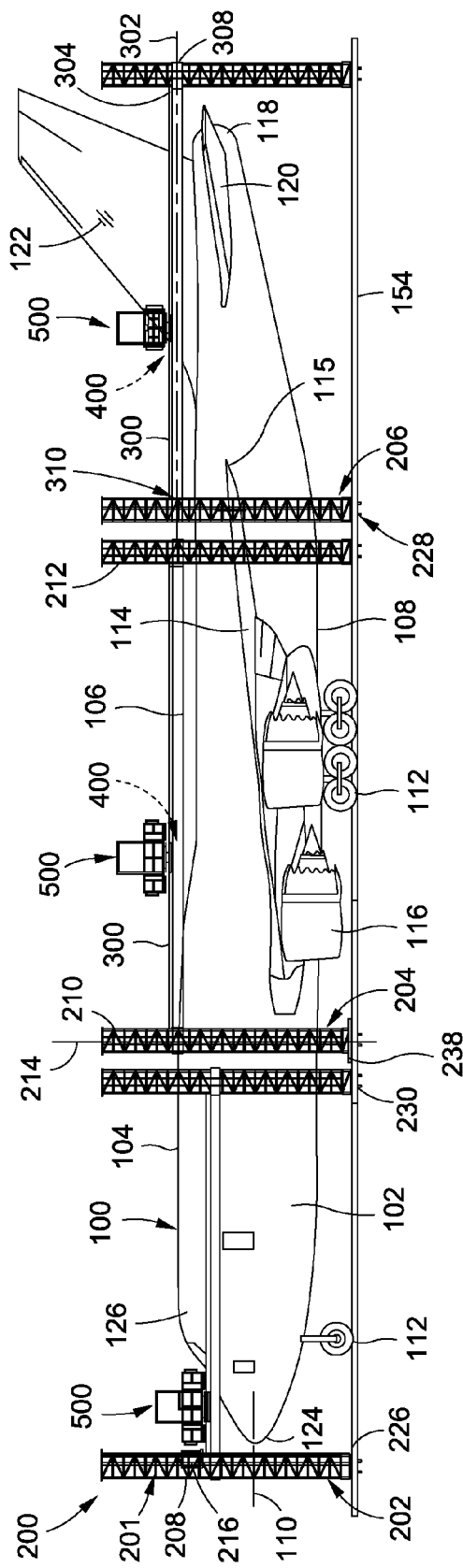
FIG. 3 is a side view of the coating application system of FIG. 1.
Figure 4:
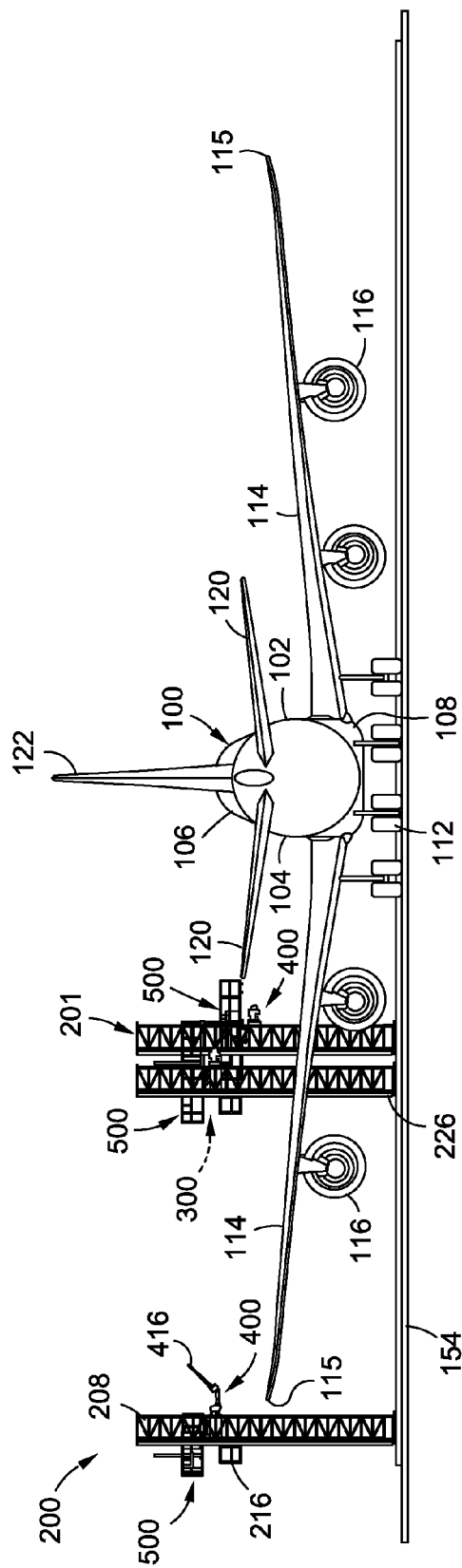
FIG. 4 is an end view of the coating application system the FIG. 1.

Referring now to the drawings wherein the showings are for purposes of illustrating various embodiments of the disclosure, shown in FIG. 1 is a perspective view of an embodiment of a coating application system 200. The coating application system 200 represents an automated system and method for performing operations associated with applying coatings such as paint to the exterior surfaces 102 of an aircraft 100. In this regard, the coating application system 200 and method disclosed herein provides a means for accessing areas of the aircraft exterior for robotically (e.g., automatically or semi-automatically) and/or manually performing any one or more of a variety of operations including, but not limited to, sanding, cleaning, surface preparation, masking, primer application, coating application, de-masking, inspection, and any one of a variety of additional operations that may be formed on the exterior surfaces 102 of an aircraft 100.

In FIGS. 1-4, the coating application system 200 may include one or more gantries 201 located on one or both sides of the aircraft 100. Each one of the gantries 201 may include a pair of vertical towers 208 that are movable along a floor track system 228. Each gantry 201 may include a crossbeam 300 extending between the towers 208. The crossbeam 300 of each gantry 201 may include at least one robotic device 400 and/or a personnel platform 500 that may be movable along the crossbeam 300. The robotic device 400 and/or the personnel platform 500 of one or more of the gantries 201 may be operated to perform one or more operations associated with applying coatings to aircraft exterior surfaces 102.

As described below, one or more of the gantries 201 may be refracted against the hangar walls 156 to facilitate aircraft movement between the gantries 201 such as during aircraft loading into a hangar and aircraft removal from the hangar. The coating application system 200 may be adapted for use with a T-shaped hangar 152 by swinging the crossbeam 300 of one gantry 201 (e.g., the center gantry 204) relative to the wings 114 using a curved track section 236 for one tower 208, and rotating the opposing tower 208 of the center gantry 204 about a vertical tower axis 214 using a turntable 238, as described below. Although FIGS. 1-4 illustrate the coating application system 200 installed within a T-shaped hanger 152, the coating application system 200 may advantageously be implemented in a rectangular or square building such as existing hangars 150 (e.g., see FIGS. 25-29), or in other building shapes and configurations.

In FIGS. 1-4, the aircraft 100 may have a fuselage 104 defining a longitudinal axis 110 (e.g., a centerline). The aircraft 100 may be supported on landing gear 112, and may include a nose 124 at the forward end and an empennage 118 at the aft end of the fuselage 104. The top of the fuselage 104 may be described as the crown 106, and the bottom of the fuselage 104 may be described as the keel 108. Advantageously, the gantry-based coating application system 200 may allow for access to the crown 106 and the keel 108 using the personnel platform 500 and/or the robotic device 400. The aircraft 100 may include a pair of wings 114 extending outwardly from the fuselage 104. One or more propulsion units 116 may be mounted to the aircraft 100 such as to the wings 114. The empennage 118 may include a horizontal tail 120 and a vertical tail 122. The horizontal tail 120 may include a pair of horizontal stabilizers and an elevator 216 pivotably coupled to each horizontal stabilizer. The vertical tail 122 may include a vertical stabilizer and a rudder pivotably coupled to the vertical stabilizer.

Although the present disclosure is described in the context of applying coatings to a tube-and-wing aircraft 100 as shown in FIGS. 1-4, the coating application system 200 may be implemented for coating any one of a variety of different types of aircraft including, but not limited to, blended wing aircraft. Further in this regard, the coating application system 200 is not limited to processing aircraft, and may be used for processing (e.g., coating) any type of vehicular or non-vehicular structure, object, system, or assembly, without limitation.

In some embodiments, the coating application system 200 may include multiple gantries 201 that may be positioned on each side of an aircraft 100. The embodiment shown in FIGS. 1-4 includes three (3) pairs of gantries 201 on each side of an aircraft 100 including a pair of forward gantries 202, a pair of center gantries 204, and a pair of aft gantries 206. By providing multiple gantries 201 on each side of the aircraft 100 instead of a single long gantry extending the length of the aircraft 100, the length of each crossbeam 300 may be reduced which may allow for a relatively high-stiffness crossbeam 300. A high-stiffness crossbeam 300 for each gantry 201 may reduce unwanted disturbance of the static positioning or dynamic motion of the end effector 416 as may otherwise occur if the crossbeams were capable of excessive flexing during movement of the robotic device 400 and/or the personnel platform 500. In this regard, the reduced length of the crossbeam 300 may allow for a high-stiffness crossbeam 300 which may translate to increased positional accuracy of the end effector 416 relative to the exterior surface 102 of the aircraft 100. In addition, providing multiple gantries 201 along each side of the aircraft 100 may allow for simultaneous positioning of personnel platforms 500 and robotic devices 400 at different location on the aircraft 100, such that different portions of the aircraft exterior may be processed at the same time. In this regard, the present disclosure also contemplates multiple robotic devices 400 and/or multiple personnel platforms 500 operated along each crossbeam 300 to further increase the ability to simultaneously process multiple locations of the aircraft exterior. Furthermore, by providing multiple gantries 201, the crossbeam 300 may be sized and configured to maximize adaptability of the coating application system 200 to a wide range of aircraft sizes.

In FIGS. 1-4, the gantries 201 on each side of an aircraft 100 may be movable in opposing relation to one another along respective floor tracks 230 to allow for positioning of each gantry 201 at any desired location relative to the longitudinal axis 110 of the aircraft 100. The floor tracks 230 of the immediately adjacent towers 208 of different gantries 201 may be positioned in relatively close proximity to one another to minimize the sideways or lateral reach requirement of each one of the end effectors 416, such that all portions of the aircraft exterior may be accessed by at least one end effector 416 of at least one gantry 201. In some embodiments, each one of the center gantries 204 may have a first tower 210 that may be rotatable on a turntable 238 associated with a first floor track 242. The second tower 212 of a center gantry 204 may be movable along a curved track section 236 or second floor track 244 for moving a second tower 212 along an arcuate direction such that the center gantry 204 may be pivoted over or under a wingtip 115 of the aircraft 100, after which the center gantry 204 may straddle a wing 114 above or below the wing 114, and may be moved along straight track sections 234 to any location along the aircraft 100, as described below.

Figure 5:
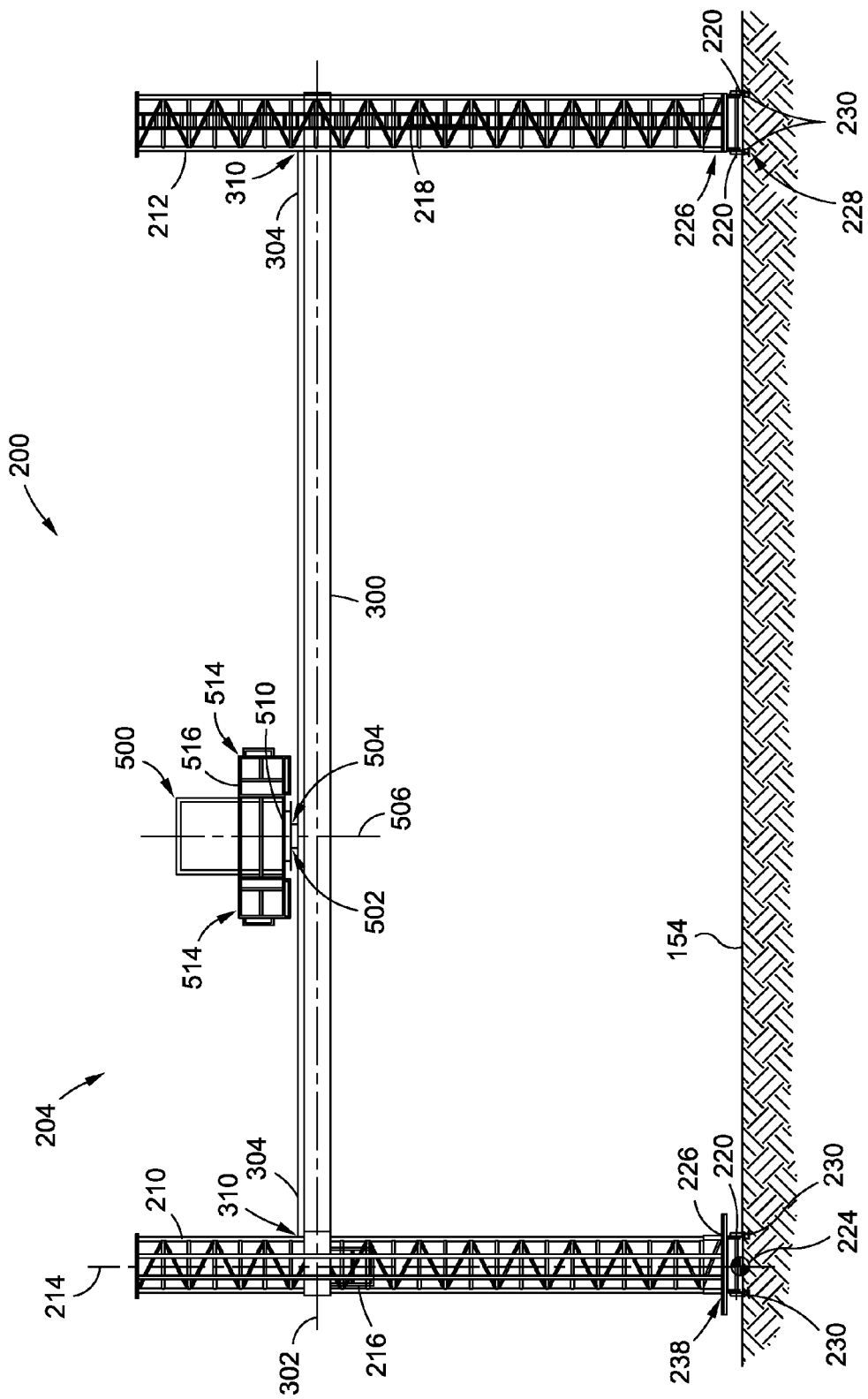
FIG. 5 is a side view of an example of a gantry including a pair of longitudinally-movable towers and a vertically-movable crossbeam extending between the towers.

In FIG. 5, each gantry 201 includes a pair of towers 208. At least one of the towers 208 of each gantry 201 may include an elevator 216 (FIG. 10) to allow access to the personnel platform 500 for performing manual operations, to service components such as the robotic device 400, to replenish coating supplies, and/or to provide other materials that may be required during processing of the aircraft exterior surfaces 102. In some examples, at least one of the towers 208 of each gantry 201 may include a ladder 218 to provide a secondary means for accessing the crossbeam 300 in the event that the elevator 216 is non-functional.

In the embodiment shown, each tower 208 may be constructed as a lightweight truss structure including four (4) vertical posts at each corner of the tower 208 and reinforcing horizontal and diagonals members interconnecting the vertical posts to increase the lateral stiffness of the tower. However, one or more of the towers 208 may be constructed with three (3) vertical posts interconnected by horizontal and/or diagonal members, or one or more of the towers 208 may be constructed with more than four (4) vertical posts. It is also contemplated that one or more of the towers 208 may be formed as a monolithic structure such as a hollow, vertical tube of any suitable cross-sectional shape.

In FIG. 6, each tower 208 may be movable along a respective pair of parallel floor tracks 230. Each tower 208 of each gantry 201 may include a motorized base 226 configured to move the tower 208 along the floor track system 228 in synchronization with the opposing tower 208 of the gantry 201. In this regard, each tower 208 may have an independent means of locomotion along the floor track system 228. The motorized base 226 of each one of the towers 208 may include a set of wheels 220 that may be spaced apart at a distance providing a stable, freestanding support for each tower 208. For example, each tower 208 may be supported by a set of four (4) wheels 220 generally located below the four (4) corners of the tower 208. Each tower 208 may be configured such that the center of gravity 224 of the tower 208 is positioned between the wheel contact points 222 as a means to provide vertical stability to the tower 208, and minimize backlash as the tower 208 is driven along the floor track 230.

Each tower 208 may include at least one driven wheel 220 for propelling the tower 208 along the floor tracks 230. In some examples, the floor track system 228 may include a plurality of strategically located rail position sensors (not shown) or position switches (not shown) to provide feedback regarding the relative location of each one of the towers 208 of each gantry 201 so that the towers 208 may be move in a synchronized manner. Each one of the floor tracks 230 may comprise a beam that may be embedded within the floor 154 of the hangar such that the top surface of each floor track 230 is generally flush with the floor 154 surface. FIG. 6 illustrates the floor tracks 230 each having an I-beam configuration. However, each floor track 230 may be provided in any one of a variety of alternative cross-sectional shapes. Furthermore, each floor track 230 is not limited to being embedded within the floor 154. For example, one or more of the tracks may protrude (not shown) above the floor 154 surface.

Figure 19:
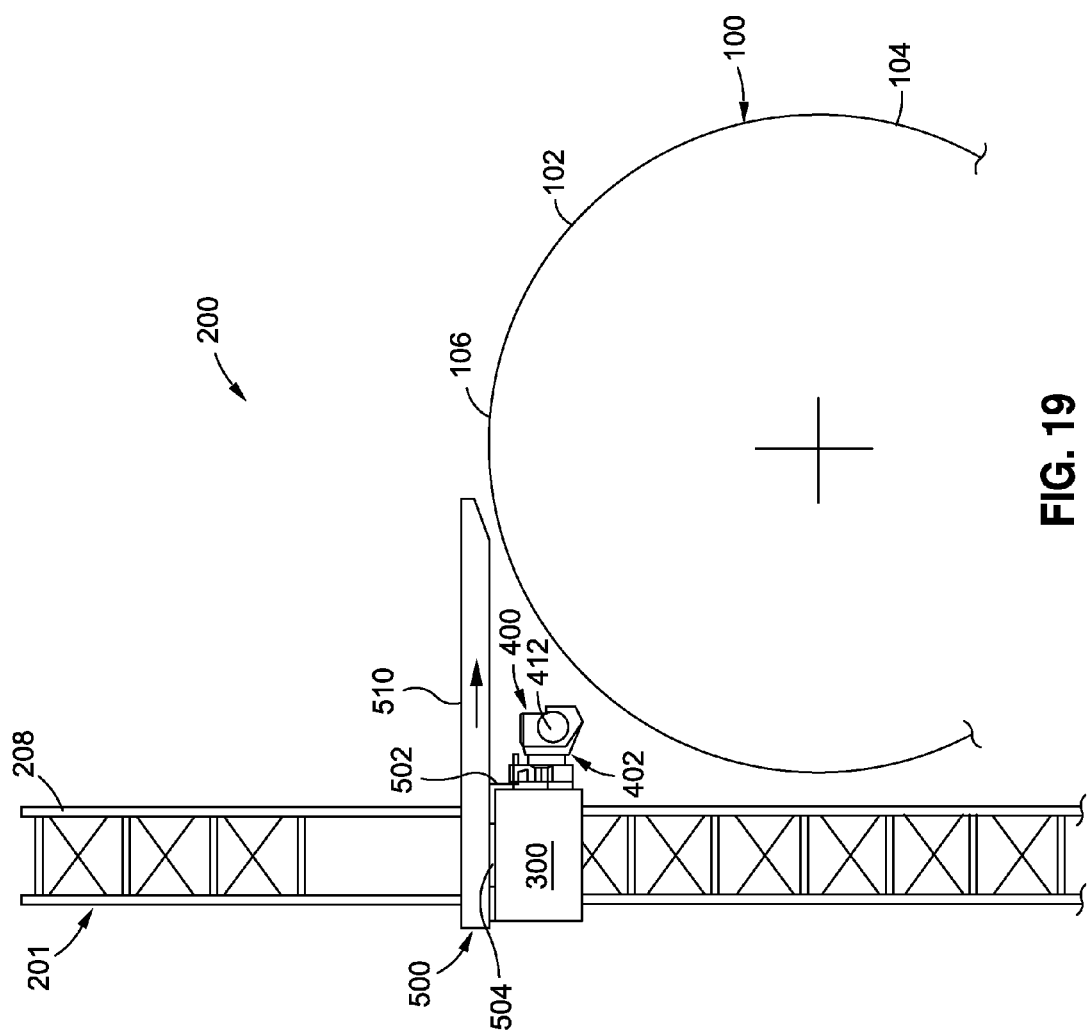
FIG. 19 is a side schematic view of one of the gantries and showing the personnel platform in an extended configuration and illustrating manual access capability provided by the personnel platform relative to the crown of the aircraft fuselage.

In FIG. 7, shown is an alternative embodiment for coupling the tower 208 to the floor track system 228. In FIG. 7, the wheels 220 of the tower 208 may be engaged to the floor track 230 in such a manner as to positively maintain the tower 208 in a substantially constant, vertical orientation, regardless of lateral loads that may be imposed due to the starting and stopping movements of the crossbeam 300 and/or robotic device 400 along the crossbeam 300. In the embodiment shown, the tower 208 attachment system may include upper and lower guide wheels 220 capturing an upper track flange 232 in an arrangement that may prevent overturning of the towers 208 in the event of excessive lateral loads. For example, in the event of an earthquake or a collision of the towers 208 with an object, the capturing of the flange 232 between the upper and lower wheels 220 may prevent overturning of the towers 208. The vertical stability of the tower 208 may also be provided by configuring each gantry such that the tower 208 center of gravity 224 is located between the wheel contact points 222, regardless of whether the personnel platform 500 is fully-loaded and/or the robotic device 400 and/or the personnel platform 500 is fully extended outwardly from the crossbeam 300, as shown in FIG. 19.

Figure 8B:
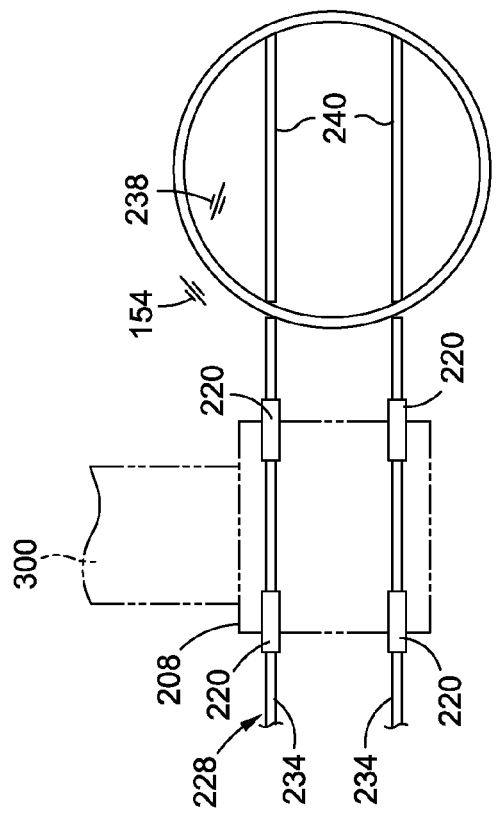
FIG. 8B is a top schematic view of the turntable embodiment of FIG. 8A illustrating the tower positioned on straight track sections and further illustrating the turntable located at a terminal end of the straight track sections.
Figure 8C:
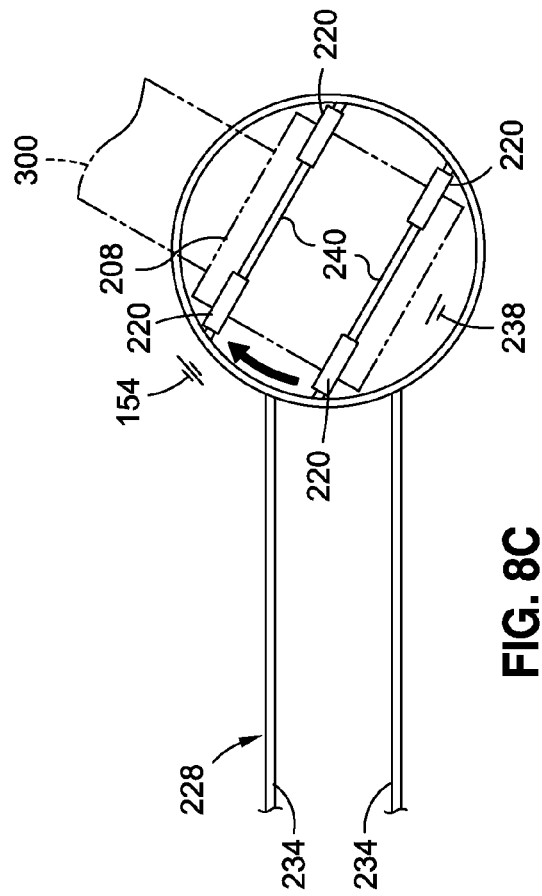
FIG. 8C is a top schematic view of the turntable embodiment of FIG. 8A illustrating the tower on the rotatable turntable tracks which are shown rotated about the vertical tower axis.
Figure 8A:
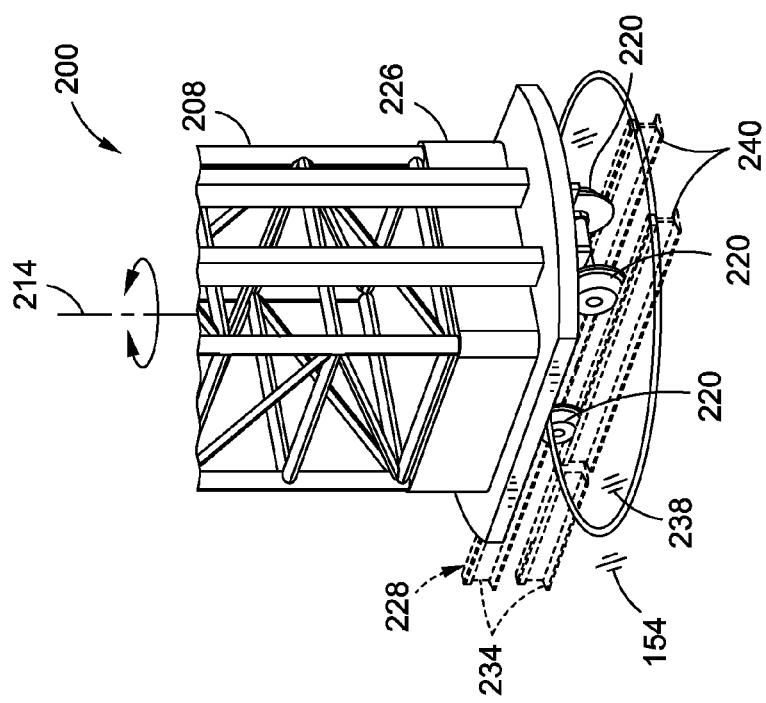
FIG. 8A is a perspective view of an embodiment of a motorized base of a tower and illustrating an embodiment of a turntable having rotatable turntable tracks for rotating the tower about a vertical tower axis.
Figure 9:
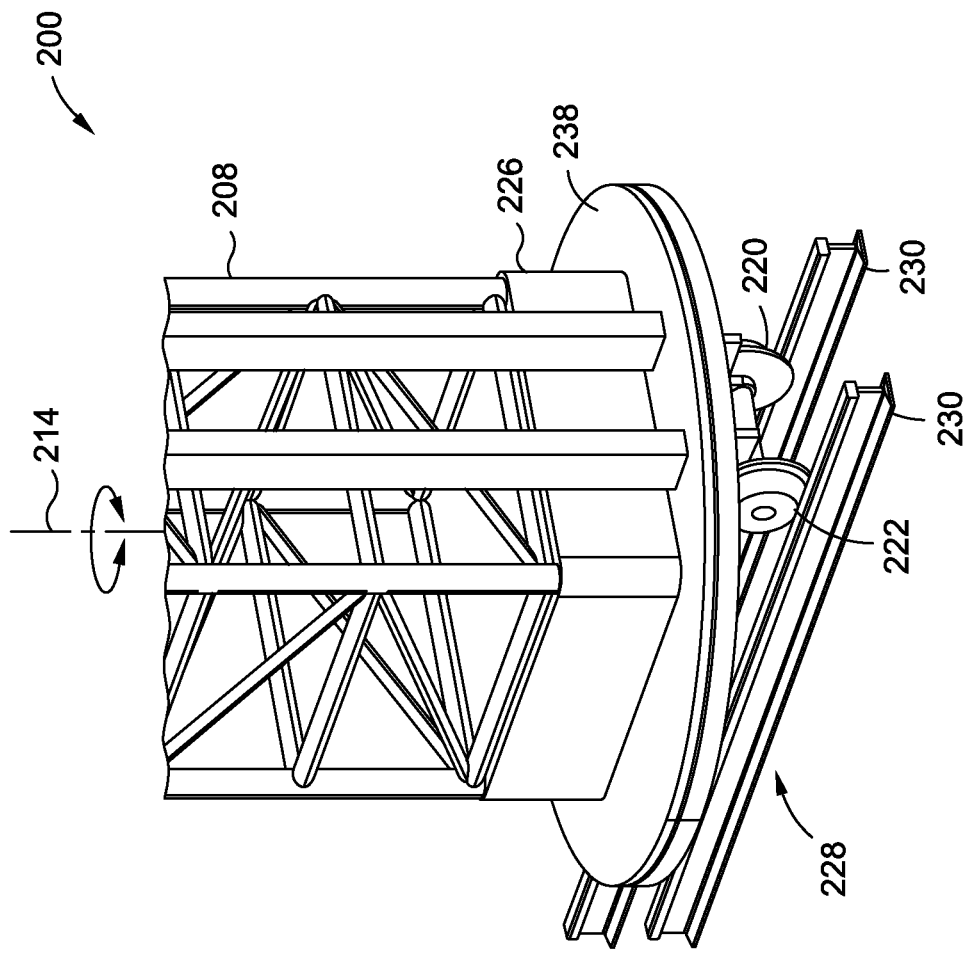
FIG. 9 is a perspective view of a further embodiment of a turntable for rotating the tower about a vertical tower axis.

FIG. 8A shows an embodiment of a turntable 238 for rotating a tower 208 about a vertical tower axis 214. In some embodiments of the coating application system 200, one or more gantries 201 may be supported on a floor track system 228 having a turntable 238 and a curved track section 236. For example, FIG. 2 illustrates a center gantry 204 that may be movable along a floor track system 228 having a curved track section 236 for arcuate movement of one tower 208 of the center gantry 204, and a turntable 238 for pivoting an opposite tower 208 of the center gantry 204 to provide a means for rotating the crossbeam 300 over or under a wingtip 115 of an aircraft 100. The turntable 238 may be incorporated into the floor tracks 230 (FIGS. 8A-8C) or the turntable 238 may be incorporated into the tower 208 base as shown in FIG. 9. In FIG. 8A, the turntable 238 is shown incorporated into the floor 154. The turntable 238 may include a pair of turntable tracks 240 having the same spacing as the straight track sections 234. In some examples of the coating application system 200, each one of the opposing terminal ends of the forward-most straight track sections 234 of the center gantries 204 may include a turntable 238. However, it is contemplated that one or more turntables 238 may be located at any location along the floor track system 228.

FIG. 8B is a top schematic view of a floor-mounted turntable 238 showing a tower 208 (shown in phantom lines) positioned on the straight track sections 234. The turntable 238 is shown located at a terminal end of the straight track sections 234. The turntable tracks 240 may be rotated into general alignment with the straight track sections 234 when the tower 208 is positioned on the straight track sections 234. The turntable tracks 240 may be sized and configured to minimize a gap (not shown) between the ends of the turntable tracks 240 and the ends of the straight track sections 234 so that the tower wheels 220 may smoothly move between the straight track sections 234 and the turntable tracks 240.

FIG. 8C is a top schematic view of the floor-mounted turntable 238 showing the tower 208 positioned on the rotatable turntable tracks 240. The tower 208, shown in phantom lines, may be positioned on the turntable 238 such that the vertical tower axis 214 is coincident with a center of rotation (not shown) of the turntable 238. The turntable 238 is shown pivoted about the tower axis 214 with corresponding pivoting of the tower 208 and the crossbeam 300 about the tower axis 214. In some examples, the turntable 238 may include one or more position switches (not shown) to indicate when the tower wheels 220 are fully engaged into the turntable tracks 240. Tripping of the position switches may deactivate the motorized base 226 of the tower 208 as a means to halt further movement of the tower 208 along the tracks. As described in greater detail below, travel of the opposing tower 208 along the curved track section 236 (see FIG. 24) may cause rotation of the turntable 238 and tower 208 about the tower axis 214. The curved track section 236 may also include one or more position switches to halt longitudinal movement of the tower 208 when the motorized base 226 reaches the end of the curved track section 236.

FIG. 9 shows an alternative embodiment of a turntable 238 for rotating a tower 208 about a vertical tower axis 214. The turntable 238 may rotatably couple the tower 208 to the wheels 220. In some examples, the turntable 238 may be configured to be locked or clamped to prevent rotation of the turntable 238 except when the tower 208 is at specific location along the floor track 230. For example, the turntable 238 may be locked to prevent rotation of a tower 208 along a substantial majority of the straight track section 234, and the turntable 238 may be unlocked to allow rotation of the tower 208 when the tower 208 reaches a terminal end of the straight track section 234. For the floor track system 228 of the center gantry 204, the curved track section 236 may be tangent to the straight track section 234. The curved track section 236 may allow movement of the tower 208 along an arc having a center of curvature located at the tower axis 214 of the opposing tower 208 of the center gantry 204. Advantageously, the turntable 238 and the curved track section 236 enable the crossbeam 300 to rotate over or under a wingtip 115 of an aircraft 100 to facilitate loading the aircraft 100 between the gantries 201 of the coating application system 200 in a manner as described below and illustrated in FIGS. 22-25.

Figure 10:
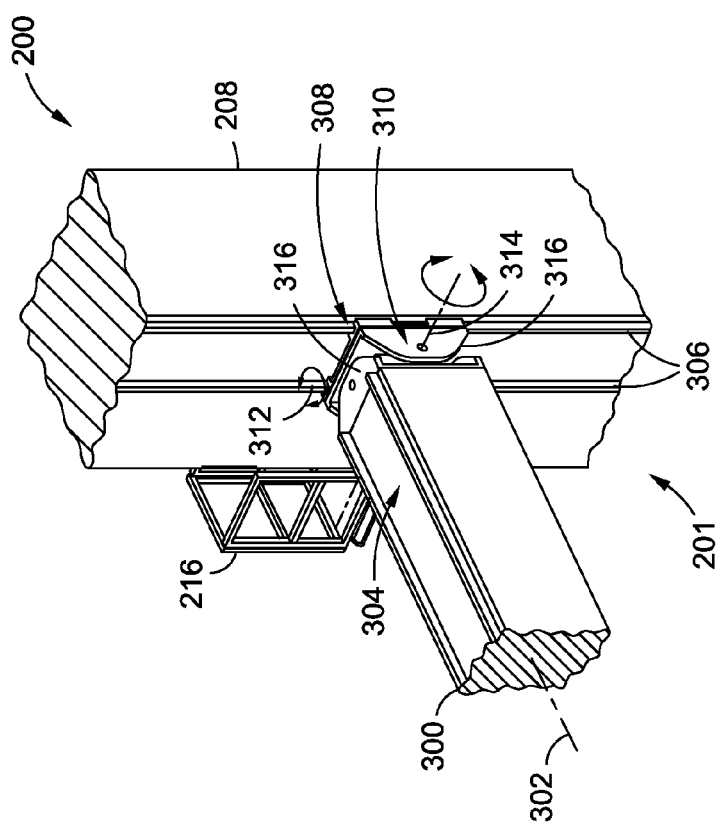
FIG. 10 is a perspective view of an embodiment of a universal joint coupling a beam end of the crossbeam to a tower to allow pivoting of the beam end about a horizontal axis of the universal joint and about a vertical axis of the universal joint.

FIG. 10 shows an embodiment of a universal joint 310 (e.g., an orthogonal, rotary joint) coupling one of the beam ends 304 of the crossbeam 300 to a tower 208. As indicated above, each gantry 201 includes a crossbeam 300 extending between the pair of towers 208. Each crossbeam 300 may be generally horizontally-oriented and may be vertically movable relative to the towers 208. For example, each crossbeam 300 may include a vertical positioning system 308 to allow each crossbeam 300 to be vertically moved from a floor 154 level to a top of the towers 208, or to any height in between. Each crossbeam 300 may be of generally fixed length and may have opposing beam ends and a crossbeam axis 302.

Figure 11:
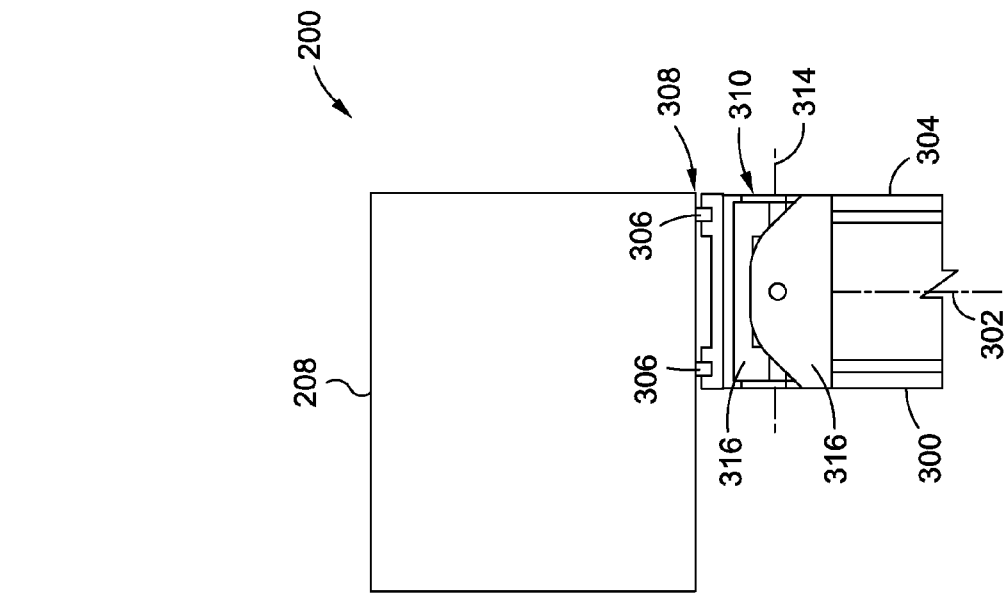
FIG. 11 is a top view of the universal joint shown in FIG. 10.

In FIG. 11, one or both of the beam ends 304 may be coupled to a tower 208 using a universal joint 310. Each universal joint 310 may allow for pivoting of the crossbeam 300 about a horizontal axis 314 of the universal joint 310 (FIG. 10) and about a vertical axis 312 of the universal joint 310 (FIG. 10). For example, in one embodiment, the universal joint 310 may include a pair of clevis fittings 316 having a vertical axis 312 and a horizontal axis 314 about which the clevis fittings 316 may rotate. Each beam end 304 may be coupled to a universal joint 310 which, in turn, may be coupled to one or more vertical beam guide rails 306 on each tower 208 for raising and lowering the crossbeam 300 in a coordinated fashion. For example, a beam end 304 may be coupled to a tower 208 by a vertical positioning system 308 such as a motorized rack-and-pinion system (not shown) to facilitate vertical movement of the crossbeam 300 relative to the towers 208. Alternatively, a motorized cable winch system (not shown) may also be incorporated into one or both towers 208 to provide vertical movement capability to the crossbeam 300.

FIG. 12 is a side view of a gantry 201 showing the universal joints 310 on opposite beam ends 304 allowing for lagging vertical movement of one of the beam ends 304 relative to an opposite beam end 304 during vertical movement of the crossbeam 300. The universal joints 310 provide rotational freedom in a horizontal plane allowing for the vertical positioning of the crossbeam 300 to lag (shown in phantom) on one tower 208 or the other tower 208 without inducing bending loads in the tower 208 or crossbeam 300 as result of the lag in motion of the beam ends 304 relative to one another. In addition, the universal joints 310 allow for deviations in the floor track 230 upon which the towers 208 move, and allow for a lag (shown in phantom) in either tower 208 while the towers 208 are moved along their respective floor tracks 230. By allowing each beam end 304 to rotate about a vertical axis 312 and a horizontal axis 314, the universal joints 310 advantageously avoid compromising the structural integrity of the gantry 201 that may otherwise occur due to bending stresses in the crossbeam 300 and/or towers 208 if the beam ends 304 were non-rotatably or rigidly coupled to the towers 208. In some embodiments, one or more sensors (not shown) may be incorporated into each one of the universal joints 310 to monitor movement of the universal joint 310 and detect when a universal joint 310 is approaching the maximum travel (e.g., rotation) capability of the universal joint 310. Upon detection of maximum travel of a universal joint 310, the motion of the crossbeam 300 and/or towers 208 may be halted such as by deactivating (e.g., stopping) the vertical positioning system 308 of the crossbeam 300 and/or by deactivating the motorized base 226 of each tower 208 as a means to avoid excessive stress in the tower 208 and crossbeam 300 and thereby protect the structural integrity of the gantry 201.

Advantageously, the universal joints 310 prevent rotation of the crossbeam 300 about the crossbeam axis 302. Furthermore, the universal joints 310 advantageously accommodate imperfections in the alignment and/or spacing of the floor tracks 230 between the pair of tower 208 of a given gantry 201. The universal joints 310 advantageously also accommodate imperfections in the vertical positioning system 308 of the crossbeam 300, and imperfections in the motorized base 226 of each tower 208. Even further, the universal joints 310 allow for slight movement of the crossbeam 300 relative to the towers 208 while simultaneously maintaining positional accuracy of the robotic device 400 along a lengthwise direction of the crossbeam 300, which may thereby preserve the accuracy with which the end effector 416 may be positioned relative to a desired location on the aircraft exterior, as may be desired during application of a coating such as paint on an area of the aircraft exterior.

Figure 14:
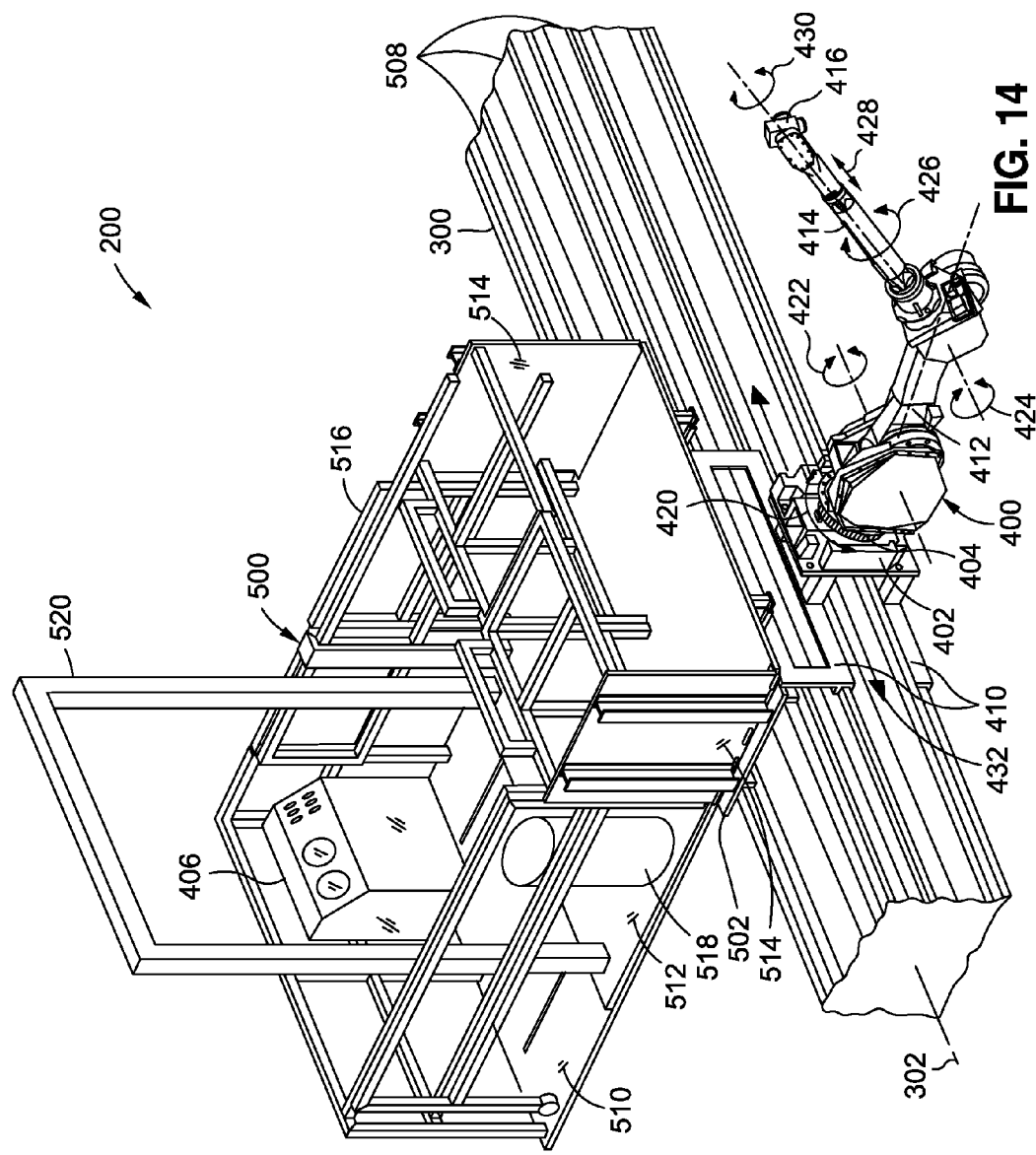
FIG. 14 is a perspective view of an embodiment of a robotic device and a personnel platform horizontally movable along the crossbeam.
Figure 15:
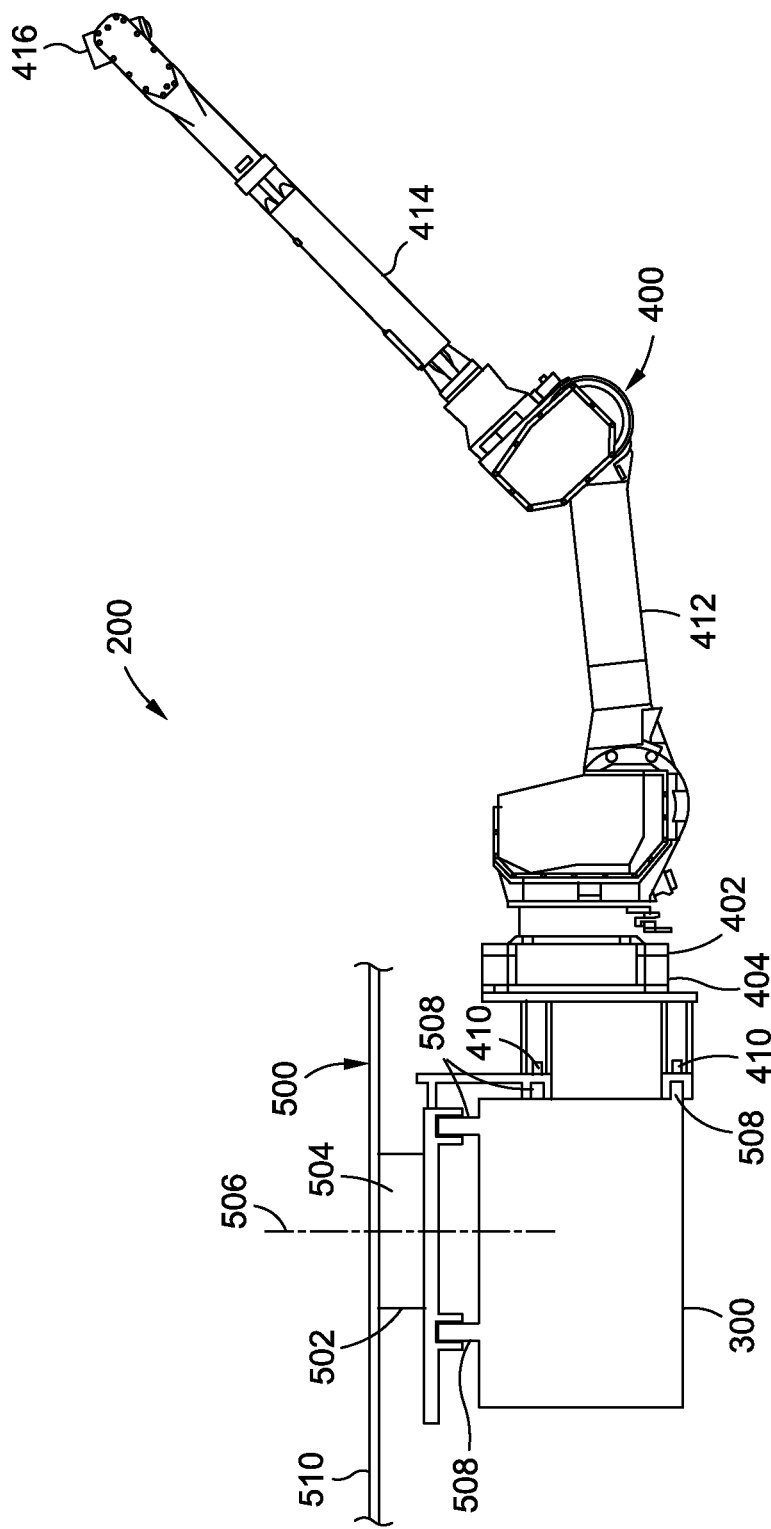
FIG. 15 is a side view of an embodiment of a robotic device having one or more arms and an end effector for performing one or more operations on an aircraft exterior surface.

FIG. 14 shows an embodiment of a robotic device 400 and a personnel platform 500 mounted to a crossbeam 300. The robotic device 400 and/or the personnel platform 500 may be movable along a lengthwise direction of the crossbeam 300. The robotic device 400 may include an end effector 416 for performing one or more operations on an aircraft exterior surface 102. For example, as indicated above, the end effector 416 may be configured to perform operations including, but not limited to, sanding, cleaning, coating, and inspecting an object surface, and other operations. In some examples, the end effector 416 may allow for change-out of end effector tools (not shown) which may be detachably mounted to the end effector 416. Each end effector tool may perform a different type of operation on one or more exterior surfaces 102 of the aircraft 100. For example, a type of tool that may be attached to the end effector 416 may be a spray jet (not shown) configured to emit a coating of material such as paint onto an aircraft surface. Another type of tool that may be attached to the end effector 416 may be an inspection camera for inspecting an aircraft surface after the surface is coated with a coating such as paint. The robot base 402 of the robotic device 400 and/or the personnel platform 500 may include a tool holder (not shown) having a plurality of different tools (not shown) that may be interchanged automatically (e.g., preprogrammed into a robot controller 406) such as upon completion of one type of operation on the aircraft exterior, or the tool change-out of the end effector 416 may be commanded by a technician. In some examples, tool change-out of the end effector 416 may be manually performed by a technician standing on the personnel platform 500.

FIGS. 13-14 show an embodiment of a robotic device 400 that may include at least one movable arm extending from the robot base 402 for articulated positioning of an end effector 416 relative to an aircraft exterior surface 102. In the example shown, the robotic device 400 may include a robot base 402, a first arm 412, a second arm 414, and an end effector 416. The robot base 402 may allow for rotation of the robot base 402 about a first axis 420 relative to the crossbeam 300. The first arm 412 may be rotatable about a second axis 422 defined by a joint coupling the first arm 412 to the robot base 402. The second arm 414 may be rotatable about a third axis 424 defined by a joint coupling the second arm 414 to the first arm 412. In addition, the second arm 414 may be swivelable about a fourth axis 426 extending along a length of the second arm 414. The length of the second arm 414 may be extendable and retractable to define a fifth axis 428 of movement.

The end effector 416 may be rotatable about a sixth axis 430 defined by a joint coupling the end effector 416 to the second arm 414. The robot base 402 may include a robot drive system 404 for propelling the robot base 402 along the length of the crossbeam 300 and defining a seventh axis 432 of movement of the robotic device 400. As described below, in some embodiments, the robotic device 400 may be moved in unison with the personnel platform 500. However, the robotic device 400 may be moved to any location along the crossbeam 300 independently of the movement of the personnel platform 500. The robotic device 400 may include any number of arms and joints for movement about or along any number of axes to allow the end effector 416 to move within one or more work zone envelopes 418 (e.g., see FIGS. 18-20) to reach any one of a variety of different locations on the aircraft exterior, as described in greater detail below.

In FIGS. 14-17, the robot base 402 may be coupled or linked to the platform base 502 of the personnel platform 500. The platform base 502 may be driven by a platform drive system 504 such that the robotic device 400 and personnel platform 500 may generally move in unison along a crossbeam 300. The platform base 502 may be guided and/or mounted by platform guide rails 508. The platform guide rails 508 may be located on a side of the crossbeam 300. For example, the platform guide rails 508 may be located on a top side and a lateral side of the crossbeam 300, although the personnel platform 500 may be movably coupled to the crossbeam 300 in any manner. The center of the robot base 402 may be generally aligned with a center of the platform base 502 when the gantry 201 is viewed along a direction perpendicular to the crossbeam axis 302. However, the robot base 402 may be located at any position relative to the location of the platform base 502. In an embodiment not shown, the robot base 402 may be attached to the crossbeam 300 independent of the platform base 502, and may be movable independently of the personnel platform 500.

FIG. 14 shows an embodiment of a personnel platform 500. The personnel platform 500 may be used for supporting personnel during the performance of any one of a variety of operations including, but not limited to, masking, stenciling, de-masking, and inspection of the exterior surfaces 102 of the aircraft 100, tool change-out of the end effector 416, or any one of a variety of other operations. As indicated above, the personnel platform 500 may be accessible by an elevator 216 and/or a ladder 218 installed on a tower 208. The personnel platform 500 may include a platform floor 510 configured to support one or more personnel. The platform floor 510 may be mounted to a platform base 502 which may be rotatable about a platform pivot axis 506 to allow pivoting of the personnel platform 500 (e.g., see FIG. 15). The pivoting capability of the personnel platform 500 may allow a forward edge of the personnel platform 500 to be aligned with an exterior surface 102 being worked on. For example, the personnel platform 500 may be pivoted about the platform pivot axis 506 to align a forward edge of the platform floor 510 with a surface of the aircraft such as the nose 124 or empennage 118 of the aircraft 100.

The personnel platform 500 may optionally include one or more segmented floor sections (not shown) that may be deployed on an as-needed basis to increase the size of the platform floor 510 and thereby provide access to difficult-to-reach exterior surfaces of the aircraft 100. The personnel platform 500 may also include fence hand rails 516 for personnel safety, and may further include a safety harness bar 520 extending over the personnel platform 500 for attachment of personnel safety harnesses. The personnel platform 500 may provide a mounting location for paint pots 518 (FIG. 14), paint mixing equipment (not shown), a robot controller 406, end effector 416 tools (not shown), and other supplies and equipment. By locating the robot controller 406, paint supplies, and equipment directly on the personnel platform 500 instead of on the floor 154, the use of relatively long power cords and paint supply lines extending from the floor 154 to the personnel platform 500 may be avoided.

Figure 16:
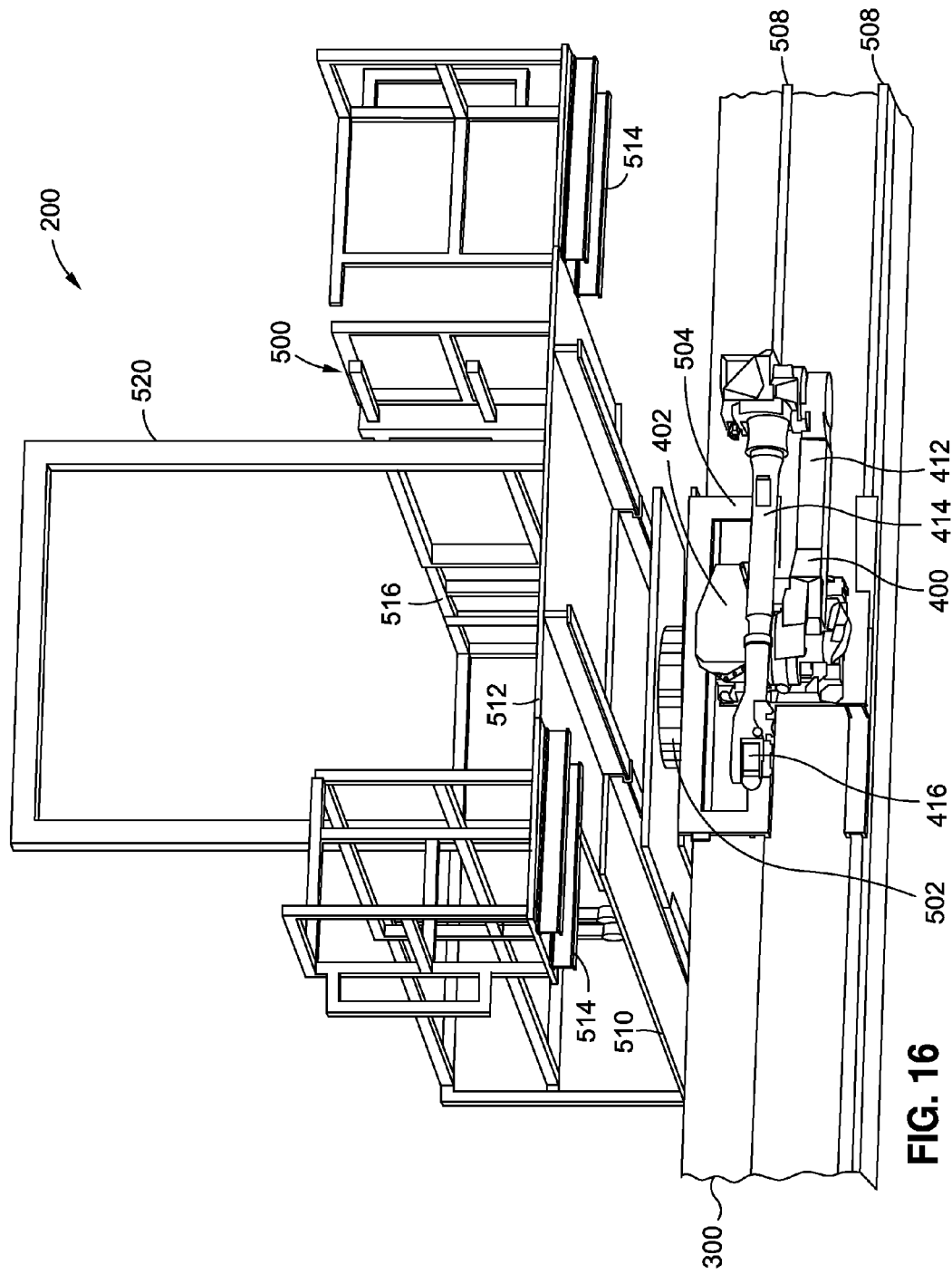
FIG. 16 is a perspective view of the robotic device in a stowed configuration below the personnel platform.
Figure 17:
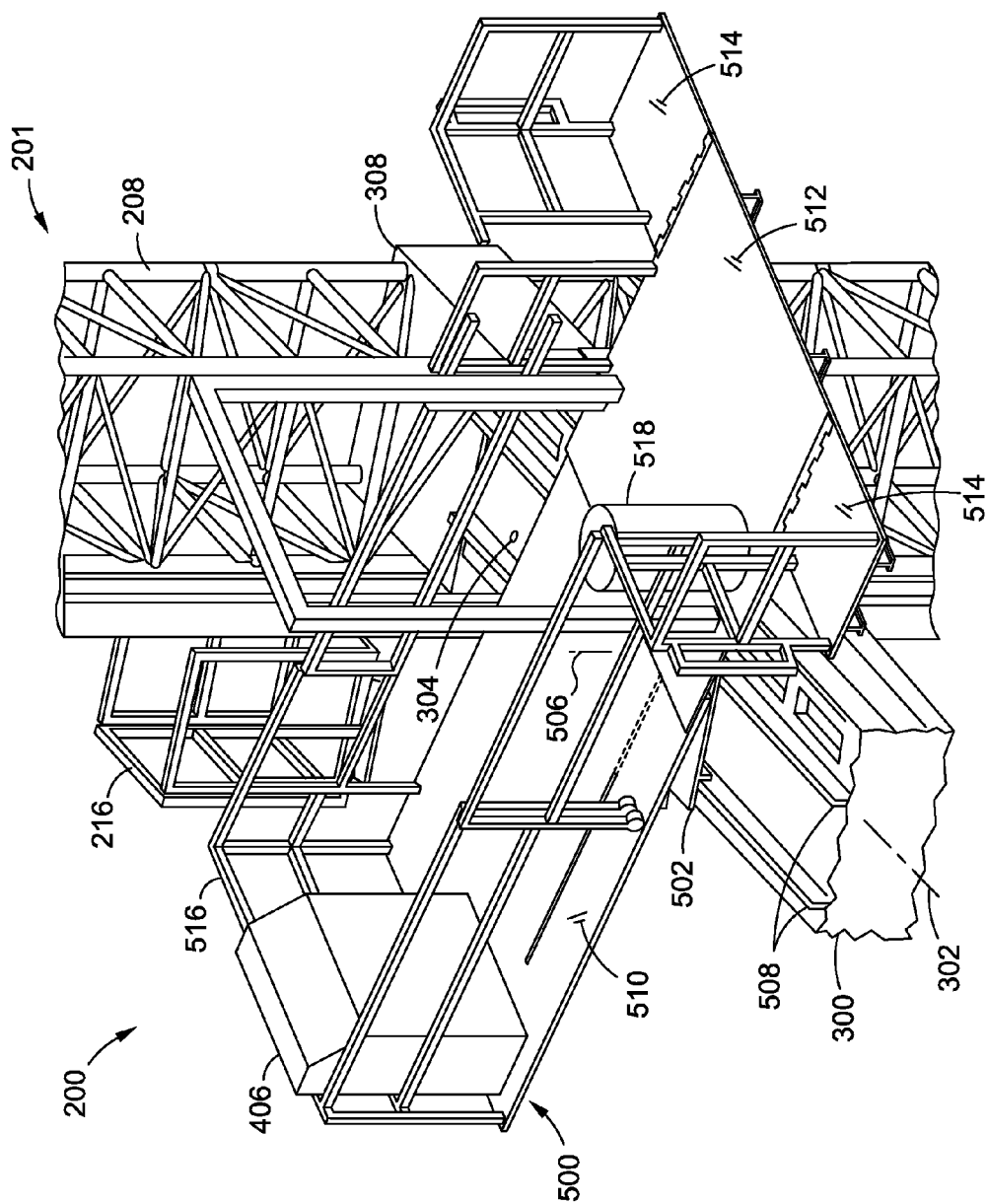
FIG. 17 is a perspective view of an embodiment of the personnel platform rotated about a vertical axis and having a platform extension extended in a forward direction and further showing a pair of side extensions folded down on opposite sides of the platform extension.

The personnel platform 500 may include a platform extension 512 that may be movable along platform floor guides (not shown) to allow the length of the platform to be extended (FIGS. 16-17) and thereby provide improved access to difficult-to-reach areas of the aircraft such as the exterior surfaces 102 of the keel 108 or the crown 106 of the fuselage 104. FIG. 14 shows the platform extension 512 in a retracted position as may be desirable when the robotic device 400 is in use. The personnel platform 500 may further include side extensions 514 which may be moved to a folded position (FIG. 14) to eliminate potential obstructions to the movement of the robotic device 400. The side extensions 514 may also be folded to allow the platform extension 512 to be retracted and thereby allow one side of the personnel platform 500 to be positioned immediately adjacent to a side of a tower 208. FIGS. 16-17 show the platform extension 512 in an extended position and the side extensions 514 in an unfolded position to form a T-shape of the personnel platform 500. As shown in FIG. 16, the robotic device 400 may be stowed below the personnel platform 500 while the platform extension 512 is retracted and the side extensions 514 are folded up. In some examples, the robotic device 400 may be stowed below the personnel platform 500 when the platform extension 512 is in the extended position and/or when the side extensions 514 are in the unfolded position. However, the robotic device 400 may be operated when the platform extension 512 is extended and/or the side extensions 514 are unfolded.

As indicated above, the coating application system 200 may include a controller 406 for controlling the operation of the robotic device 400 and/or the personnel platform 500. For example, the controller 406 may control the movement of the robotic device 400 and/or the personnel platform 500 along a lengthwise direction of the crossbeam 300. In some examples such as where the robotic device 400 may be moved along the crossbeam 300 independently of the movement of the personnel platform 500 along the crossbeam 300, the controller 406 may be configured to control the velocity and/or accelerations of the robotic device 400 and/or the personnel platform 500 along a lengthwise direction of the crossbeam 300. In this regard, the controller 406 may advantageously control the velocity and acceleration of the two major moving masses (e.g., the personnel platform 500 and the robotic device) as a means to limit the magnitude of lateral loads on the towers 208 that may be generated by stopping and starting movements of the personnel platform 500 and/or robotic device 400. For example, the velocity and/or acceleration of the robotic device 400 may be controlled in a manner to counteract the accelerations of the personnel platform 500 as a means to reduce acceleration-induced lateral loads on the towers 208. The acceleration-induced lateral-loads may be described as inertial loads.

The controller 406 may control the positive acceleration (e.g., increasing linear velocity) and negative acceleration (e.g., decreasing linear velocity) of the robotic device 400 relative to the linear accelerations of the personnel platform 500 along the crossbeam 300.

The controller 406 may control the timing and magnitude of the accelerations during stopping and starting movement of the robotic device 400 and/or personnel platform 500 along the crossbeam 300 as a means to reduce or prevent the disruption of the position of the end effector 416 tip relative to the exterior surfaces being worked on, and thereby provide for increased control over the positional accuracy of the end effector 416 tip relative to an exterior surface. For example, certain operations (e.g., spraying a coating) performed by the end effector 416 may require relatively precise control over the position and movement of the end effector 416 relative to the exterior surface 102. By controlling the relative acceleration of the personnel platform 500 and the robotic device 400 during movement along the crossbeam 300, inaccuracies in the position of the end effector 416 tip may be minimized. In some examples, the controller 406 may be effective to reduce acceleration-induced jarring or disruption of the position and/or movement of the end effector 416 tip in a manner to maintain the locational tolerance of the end effector 416 to within a +/−0.050 inch or less relative to a position on the exterior surface 102.

As indicated above, in some embodiments, the robot base 402 may be coupled to the platform base 502 such that the robotic device 400 and personnel platform 500 may generally move in unison along a lengthwise direction of the crossbeam 300. The robot base 402 may be generally centered relative to the platform base 502 when the gantry 201 is viewed along a direction perpendicular to the crossbeam axis 302. In such an arrangement, the end effector 416 may have the same amount of reach in a left direction when the robotic device 400 is located at a left beam end 304 of the crossbeam 300, as the reach of the end effector 416 in a right direction when the robotic device 400 is located at a right beam end 304 of the crossbeam 300. However, when the side extensions 514 of the personnel platform 500 are folded down (e.g., see FIG. 17) and the platform extension 512 is refracted (e.g., see FIG. 14), the personnel platform 500 must stop at a greater distance from each tower 208 to avoid colliding with the tower 208. Limiting the proximity of the personnel platform 500 to the tower 208 may reduce the lateral reach of the end effector 416. Although the floor track system 228 may be arranged in a manner to position the towers 208 of immediately-adjacent gantries 201 relatively close to one another to provide overlapping work zone envelopes 418 for the robotic devices 400 of the adjacent gantries 201, the positioning of the personnel platform 500 at a greater distance from the tower 208 as a result of the folded-down configuration of the side extensions 514 may result in a gap between the work zone envelopes 418 of the robotic devices 400 of adjacent gantries 201.

Advantageously, the coating application system 200 may address the potential constraint of non-overlapping work envelopes of adjacent gantries 201 by providing the capability of the robotic device 400 to move relative to the platform base 502. For example, the robot base 402 may be coupled to the platform base 502 by means of a pair of robot base guide rails 410 (FIG. 14) that may be mounted on the platform base 502. The robot base guide rails 410 may allow for movement of the robot base 402 relative to the platform base 502 along the direction of the crossbeam 300. For example, when the personnel platform 500 is stationary and positioned adjacent to a tower 208, the controller 406 may be configured to independently move the robot base 402 along the robot base guide rails 410 toward an outboard side of the tower 208. In this regard, the relative movement of the robot base 402 relative to the personnel platform 500 may represent an eighth axis (not shown) of movement of the robotic device 400. In some examples, the robot base guide rails 410 may have a length allowing the robot base 402 to travel beyond the outboard side of a tower 208. By mounting the robot base 402 on separate robot base guide rails 410, the work zone envelope 418 of the robotic device 400 may be laterally extended relative to the beam end 304, and may thereby allow for overlapping work zone envelopes 418 of the robotic devices 400 of adjacent gantries 201.

Figure 18:
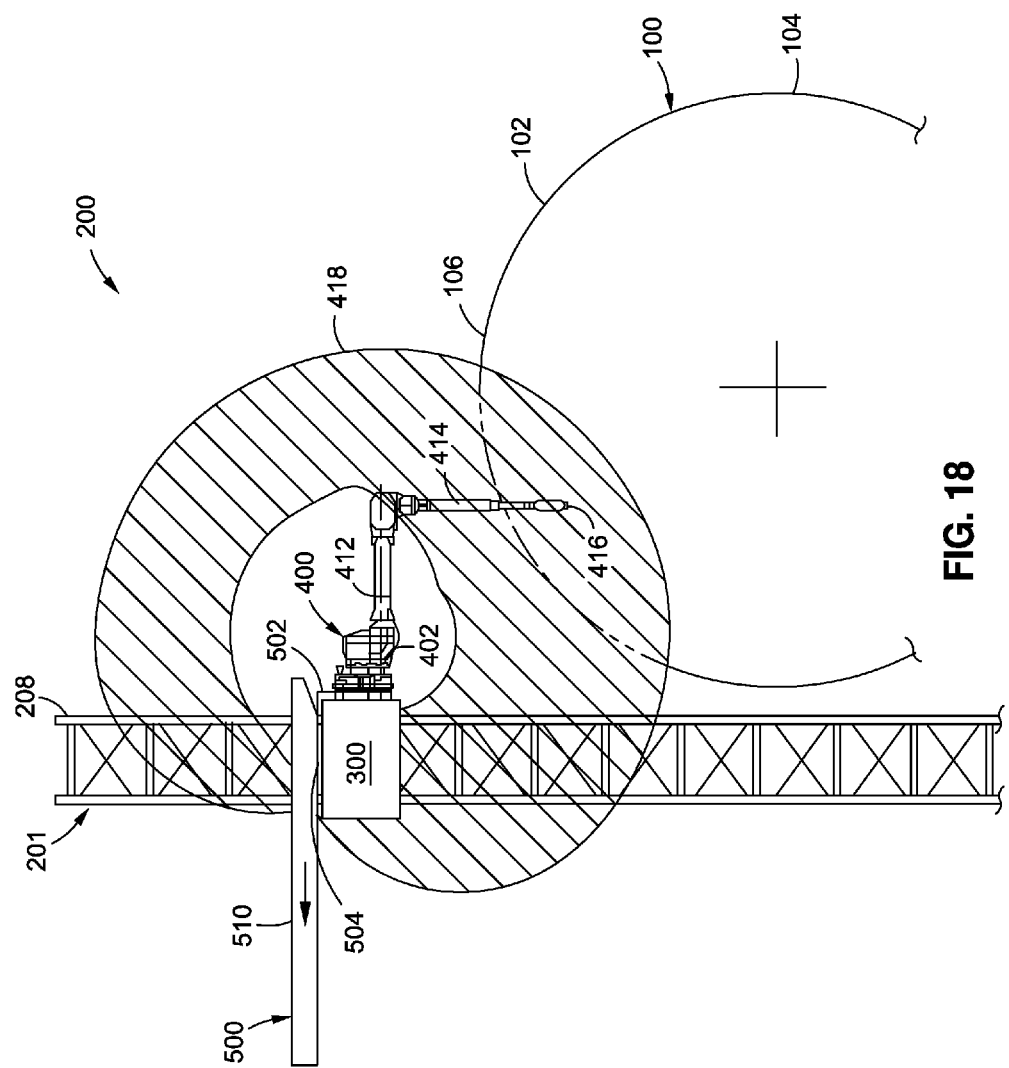
FIG. 18 is a side schematic view of one of the gantries and showing a work zone envelope of the end effector relative to a crown of an aircraft fuselage.
Figure 25:
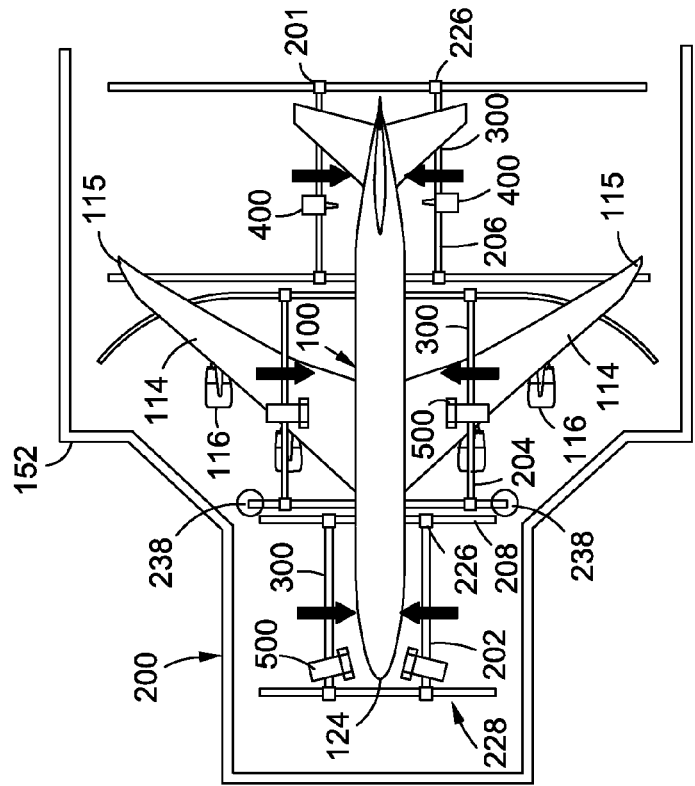
Figure 29:
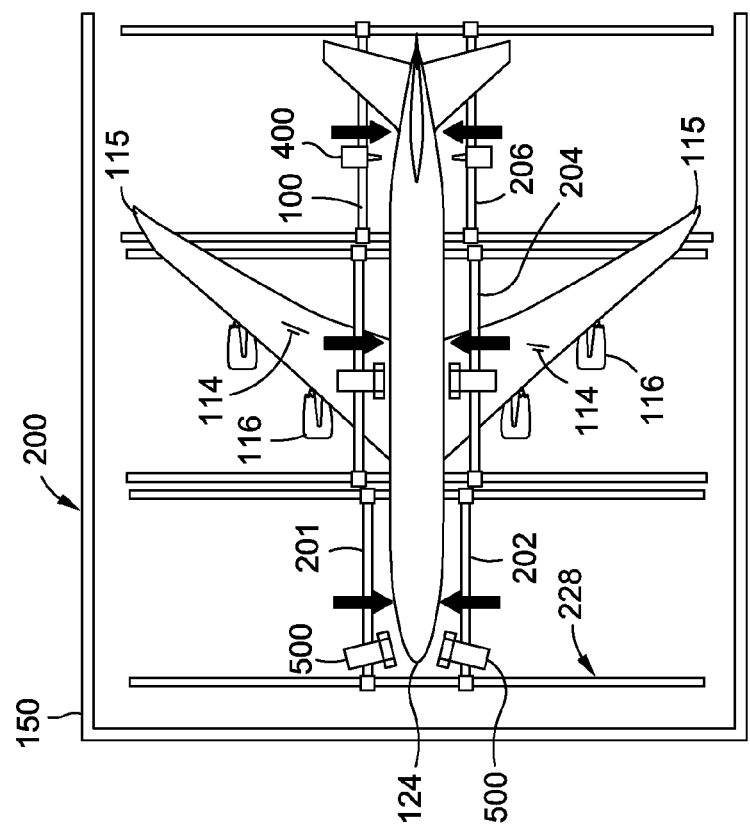

FIG. 18 shows an example of a work zone envelope 418 of an end effector 416 and schematically illustrates the range of motion of the end effector 416 relative to a crown 106 of an aircraft fuselage 104. To access the crown 106 of the fuselage 104, the crossbeam 300 may be vertically positioned at a level higher than the highest point of the fuselage 104. As shown in FIGS. 25 and 29 and described below, the towers 208 of the gantry 201 may be moved along the floor track system 228 to position the gantry 201 into close proximity to the aircraft fuselage 104. The personnel platform 500 may be configured as shown in FIG. 14 wherein the platform extension 512 may be retracted and the side extensions 514 may be folded up. In some embodiments, the personnel platform 500 may be movable along a direction transverse to the crossbeam axis 302 to move a forward edge of the personnel platform 500 at least partially out of the range of motion of the arms of the robotic device 400 to avoid obstructing the movement of the robotic device 400.

FIG. 19 shows a configuration of a gantry 201 for providing manual access to a crown 106 of the fuselage 104 using the personnel platform 500. The robotic device 400 may be stowed underneath the personnel platform 500 in a manner shown in FIG. 16. The crossbeam 300 may be vertically positioned at the desired height relative to the aircraft 100. The personnel platform 500 may be configured as shown in FIG. 17 by extending the platform extension 512 outwardly, and/or unfolding the side extensions 514. In some embodiments, the personnel platform 500 may be movable along a transverse direction relative to the crossbeam axis 302 (e.g., see FIGS. 18-20). The gantry 201 may be moved into close proximity to the aircraft fuselage 104. Access to different locations on the aircraft fuselage 104 may be provided by adjusting the position of the gantry 201 along the floor tracks 230, adjusting the vertical position of the crossbeam 300, adjusting the position of the personnel platform 500 along the length of the crossbeam 300, and/or configuring the personnel platform 500 such as by deploying and retracting the platform extension 512 and/or the side extensions 514.

Figure 20:
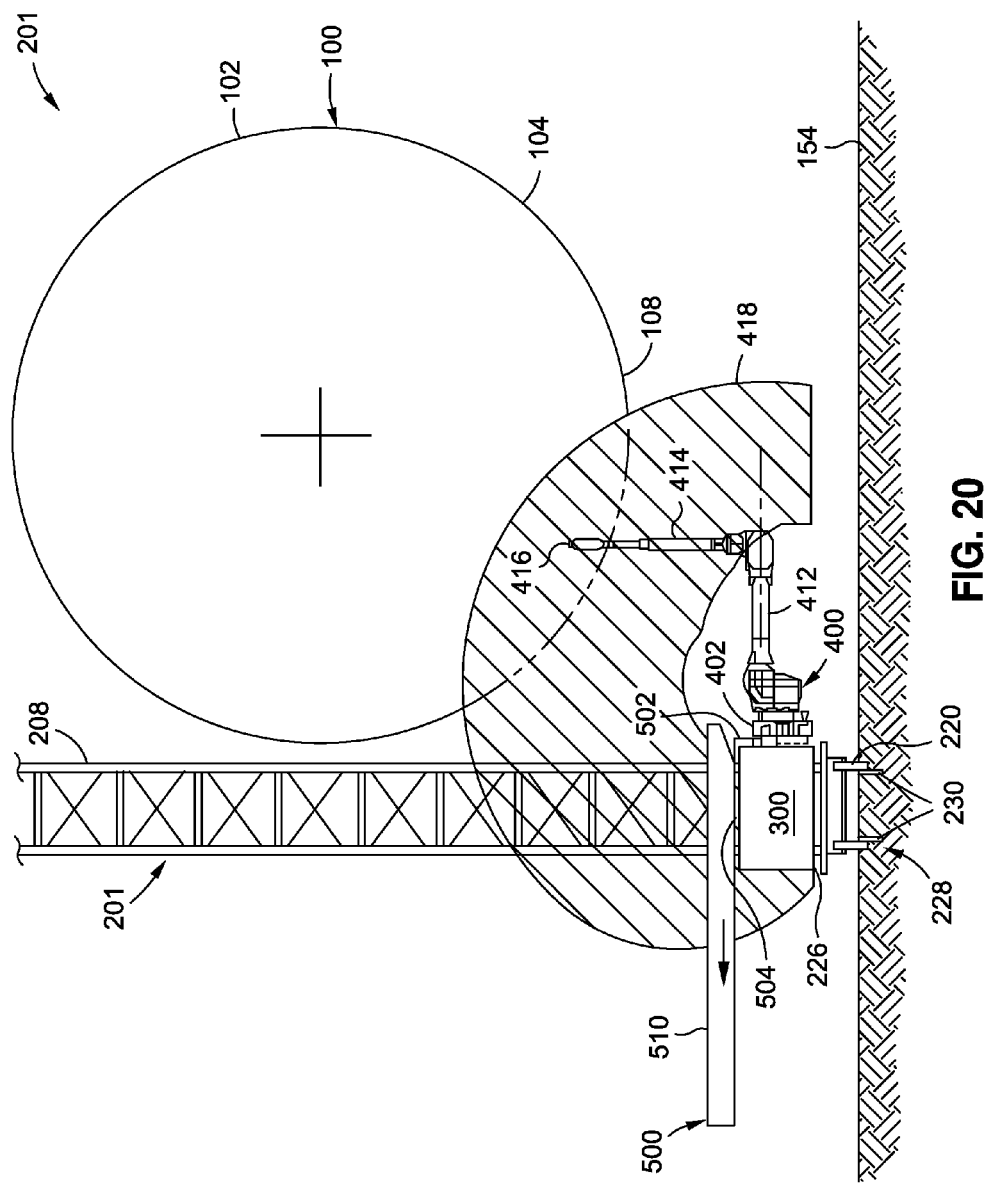
FIG. 20 is a side schematic view showing the work zone envelope of the end effector relative to a keel of an aircraft fuselage.

FIG. 20 shows an example of a work zone envelope 418 of the end effector 416 for accessing the exterior surfaces 102 of an aircraft fuselage 104. The procedure for accessing the keel 108 of the aircraft 100 may be similar to the above-described procedure for accessing the crown 106. In this regard, the crossbeam 300 may be vertically positioned at a height that is lower than a mid-level of the fuselage 104. The personnel platform 500 may be configured similar to FIG. 14 with the personnel platform 500 and/or the platform extension 512 fully or partially retracted and the side extensions 514 folded up. The towers 208 may be positioned along the floor track system 228 to position the gantry 201 at a desired distance from the aircraft fuselage 104 to optimize the work zone envelope of the end effector 416 relative to the aircraft exterior surface 102.

With the robotic device 400 positioned at the desired height, the robotic device 400 may be maintained in a stationary position relative to the crossbeam 300, and the end effector 416 may perform operations on the exterior surfaces 102 of the aircraft using radially-directed strokes or movements of the end effector 416. Alternatively, the end effector 416 may perform longitudinally-directed strokes by holding the arms of the robotic device 400 generally stationary, and moving the robotic device 400 along a lengthwise direction of the crossbeam 300. In a further embodiment, the end effector 416 may perform a combination of radial strokes, longitudinal strokes, or any one of a variety of other strokes of the end effector 416.

Figure 21:
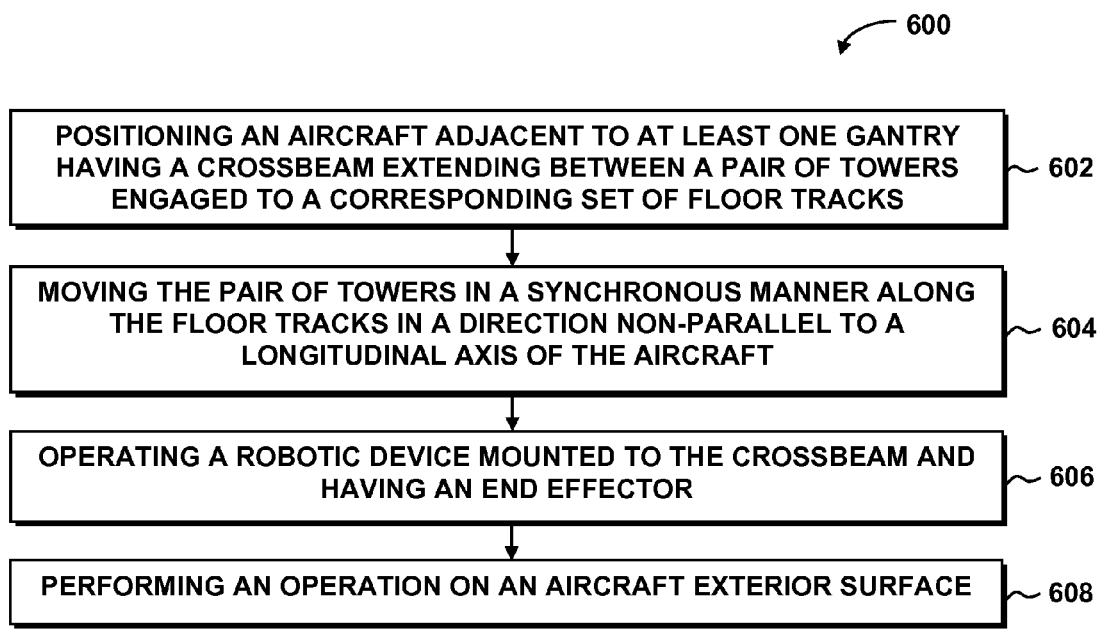
FIG. 21 is a flow chart illustrating one or more operations that may be included in a method of coating an aircraft.

In FIG. 21, shown is a flowchart having one or more operations that may be included in a coating application method 600 such as may be implemented for preparing one or more exterior surfaces 102 of an aircraft 100 to receive a coating, or for applying a coating to the exterior surfaces 102. Advantageously, the method may represent a low-cost approach for automating access to exterior surfaces 102 of an aircraft 100 including accessing difficult-to-reach areas such as the crown 106 including the over-wing area of the fuselage 104, the keel 108, the vertical tail 122, the exterior of the cockpit 126 at the nose of the aircraft 100, and other areas.

Step 602 of the method 600 may include positioning an aircraft 100 adjacent to at least one gantry 201 having a crossbeam 300 extending between a pair of towers 208 engaged to a corresponding set of floor tracks 230. FIGS. 22-25 schematically illustrate a process for loading an aircraft 100 between a set of gantries 201 of a coating application system 200 installed in a T-shaped hanger 152. The coating application system 200 as shown includes three (3) sets of gantries 201 on each side of the T-shaped hanger 152, including a forward gantry 202, a center gantry 204, and an aft gantry 206. However, the coating application system 200 may include any number of gantries 201 and which may be located on one or both sides of the aircraft 100. In FIG. 22, the T-shaped hanger 152 may have a relatively narrow width or reduced width at the forward end of the T-shaped hanger 152.

The reduced width at the forward end of the T-shaped hanger 152 may accommodate support facilities, offices, equipment storage areas, or other areas at the forward end of the T-shaped hanger 152. The T-shaped hanger 152 may also include a tapered section transitioning the narrow forward area of the T-shaped hanger 152 to a wider area at the aft end of the T-shaped hanger 152. Each one of the forward 202, center 204, and aft gantries 206 may be movable along their respective floor tracks of the floor track system 228. The center gantries 204 may each be movable along straight track sections 234. The straight track section 234 for a forward-most tower 208 of the center gantry 204 may include a curved track section 236 at an outboard end of the straight track section 234. An aft-most tower 208 of the center gantry 204 may be rotatable on a turntable 238 (e.g., see FIGS. 8A-8C and 9) for pivoting the aft tower 208 about a tower axis 214 (FIG. 6). In one example, the turntable 238 may be incorporated into the hangar floor 154 as shown in FIGS. 8A-8C. When both towers 208 of the center gantry 204 are at their extreme outboard position on the floor track system 228, a forward-most tower 208 may be positioned on the turntable tracks 240 and the opposing tower 208 may be positioned on the curved track section 236 which may be tangent to the straight track section 234 as shown in FIG. 22.

The crossbeam 300 may be oriented generally parallel to a typical wing sweep angle of an aircraft 100.

Figure 24:
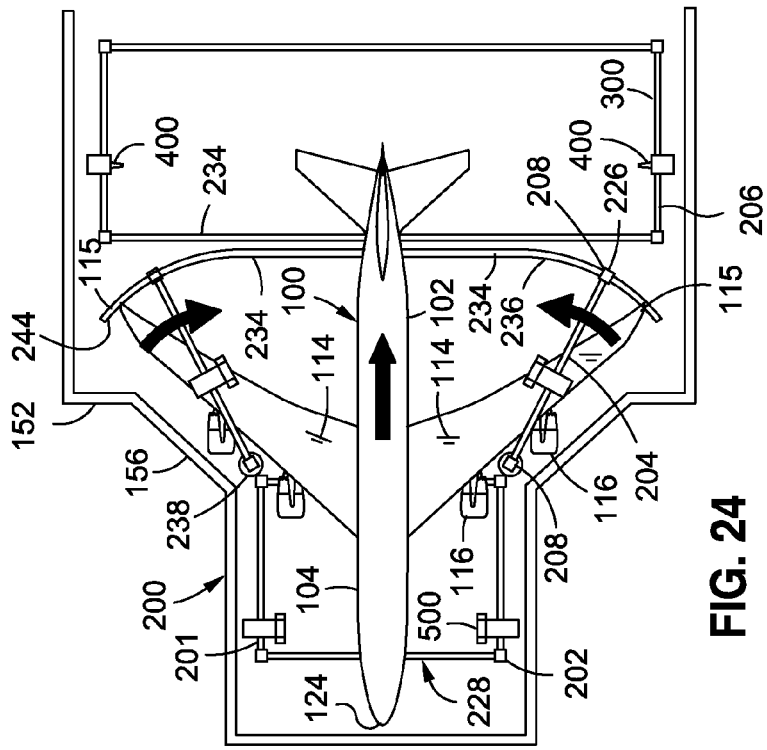

FIG. 22 illustrates forward motion of an aircraft 100 into a T-shaped hanger 152. In FIGS. 22-5, each one of the gantries 201 may be initially positioned adjacent to the hangar walls 156. The aircraft 100 may be moved in a forward direction into the T-shaped hangar 152 until the wingtips 115 on each side of the aircraft 100 are positioned forward of the curved track section 236 of each one of the center gantries 204 as shown in FIG. 23. FIG. 24 illustrates rotation of the center gantries 204 over or under the wingtips 115. As indicated above, the forward-most tower 208 of the center gantry 204 may rotate about its tower axis 214 (FIG. 6) such as on a turntable 238 device (FIG. 8A-8C). The aft-most tower 208 of the center gantry 204 may be movable along the curved track section 236 which may have a center of curvature at the tower axis 214 of the opposing tower 208. Once the aft-most tower 208 of each center gantry 204 is rotated past the wingtips 115, the aircraft 100 may be moved in an aftward direction while the gantry 201 may be simultaneously moved in a longitudinal direction toward the aircraft 100 in a manner such that the towers 208 are maintained a safe distance from the leading and trailing edge of the wing 114 and a safe distance from the propulsion units 116 as shown in FIG. 25.

In some examples, the coating application system 200 may include an aircraft positioning device (not shown) such as a small tug that may be coupled to one of the landing gear 112 (FIG. 3) such as the nose gear of the aircraft 100. The aircraft positioning device may be configured to move the aircraft 100 in a forward and aftward direction in automated coordination with the rotation of the center gantry 204 over the wingtips 115 and in coordination with the inboard and outboard movement of the gantries 201 along the straight track sections 234. In this regard, such an aircraft positioning device may position the aircraft 100 in a forward and aftward direction in coordination with the motorized base 226 of the towers 208 during the process of loading and unloading an aircraft 100 from between the gantries 201 of the coating application system 200.

Figure 28:
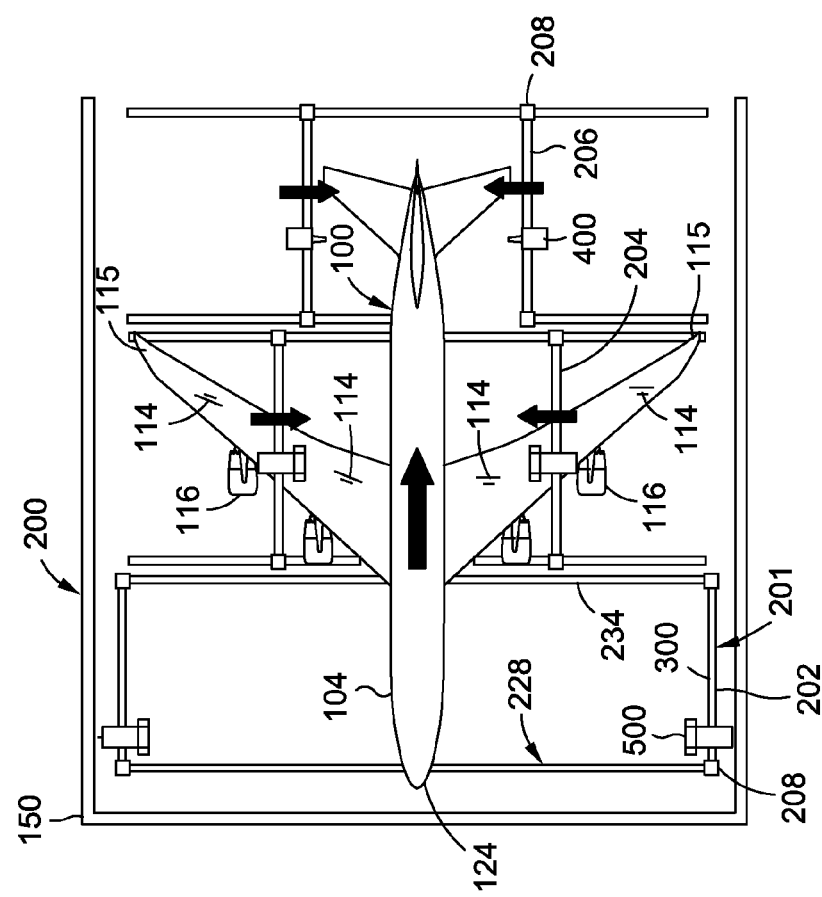

FIGS. 26-29 are schematic illustrations of a process for loading an aircraft 100 between a set of gantries 201 of a coating application system 200 installed in a rectangular hanger 150. FIG. 26 illustrates forward motion of the aircraft 100 into the rectangular hanger 150 until the wingtips 115 are positioned forward of the straight track section 234 of each one of the center gantries 204 as shown in FIG. 27. FIG. 28 illustrates aftward motion of the aircraft 100 during inboard motion of each one of the center gantries 204. As indicated above, the aircraft 100 may include an aircraft positioning device that may be coupled to the nose gear and/or main landing gear 112 (FIG. 3) to automatically move the aircraft 100 forward and the aft in coordination with the motion of the center gantries 204.

Step 603 of the method 600 may include moving the pair of towers 208 of each gantry 201 in a synchronous manner along the floor tracks 230 in a direction non-parallel (e.g., perpendicular) to the longitudinal axis 110 of the aircraft 100. In this regard, FIGS. 25 and 29 illustrate movement of each one of the gantries 201 along the floor tracks 230 along an inboard direction toward the aircraft fuselage 104. The process of moving the towers 208 may include allowing the crossbeam 300 of a gantry 201 to rotate about a vertical axis 312 of a universal joint 310 (FIGS. 10-11) about each beam end 304 when one tower 208 lags behind an opposite tower 208 during horizontal movement of the towers 208 along the floor tracks 230 as shown in FIG. 14. In addition, the method may include allowing the crossbeam 300 of a gantry 201 to rotate about a horizontal axis 314 of the universal joint 310 about each beam end 304 when one beam end 304 lags behind an opposite beam end 304 during vertical movement of the crossbeam 300 relative to the towers 208 as shown in FIG. 12. Advantageously, the universal joints 310 minimizes stress that may otherwise be imposed on the tower 208 and/or crossbeam 300 if the connection between the beam ends 304 and the towers 208 was a rigid connection.

The method may further include moving the crossbeam 300 vertically relative to the towers 208, and/or moving the gantry 201 along the floor track system 228 to position the crossbeam 300 at a desired distance from the aircraft 100. The distance of the crossbeam 300 from an aircraft exterior surface may be dependent upon on the type of operation to be performed. For example, a manual operation to be performed by one or more technicians may require positioning the crossbeam 300 in relatively close proximity to the aircraft surface to be worked on. Conversely, an operation to be performed by the robotic device 400 may require positioning of the crossbeam 300 at a greater distance from the aircraft surface to optimize the work zone envelope 418 of the end effector 416.

Step 606 of the method 600 may include operating one or more robotic devices 400 mounted to a crossbeam 300 of one or more gantries 201. For example, the method may include moving a robotic device 400 along a lengthwise direction of a crossbeam 300 to position the end effector 416 at a desired location for optimizing the work zone envelope 418 of the end effector 416 relative to an exterior surface 102 of the aircraft 100. As indicated above, the controller 406 of the robotic device 400 and the personnel platform 500 may be configured to control the timing and magnitude of the accelerations of the personnel platform 500 relative to the robotic device 400. In this regard, the method may include controlling accelerations of the robotic device 400 along the crossbeam 300 in a manner counteracting accelerations of the personnel platform 500, and thereby reducing acceleration-induced lateral loads on the towers 208.

Step 608 of the method 600 may include performing one or more operations on an aircraft exterior surface 102. For example, operations may be performed using an end effector 416 of a robotic device 400. In this regard, the method may include rotating a robot base 402 and/or manipulating at least one arm of the robotic device 400 to position the end effector 416 relative to the aircraft exterior surface 102. As indicated above, the robot base 402 of the robotic device 400 may be maintained in a stationary position on the crossbeam 300 and the arms and end effector 416 of the robotic device 400 may be moved in an articulated manner to perform one or more operations on the aircraft surface. For example, the robot base 402 may be stationary on the crossbeam 300, and the arms 412, 414 and the end effector 416 may be moved to allow the end effector 416 to perform radial strokes on an exterior surface 102 of the aircraft 100. Alternatively, the arms 412, 414 of the robotic device 400 may be generally held stationary while the robot base 402 is moved lengthwise along the crossbeam 300 for performing longitudinal strokes by the end effector 416 along a length of an exterior surface 102 of the aircraft 100. As may be appreciated, a combination of movements may be implemented for moving or positioning the end effector 416 to perform a desired operation on one or more aircraft exterior surfaces 102. Operations that may be performed on an aircraft exterior surface 102 include, but are not limited to, sanding, cleaning, masking, coating, curing, de-masking, inspecting a coated surface, and any one of a wide range of other operations.

The method 600 may also include manually performing one or more operations on an aircraft exterior surface 102 using a personnel platform 500 mounted to the crossbeam 300. For example, any one of the above-mentioned operations of sanding, cleaning, masking, coating, de-masking, and inspecting, or any other operation, may be manually performed by one or more technicians supported on one or more personnel platforms 500. As indicated above, one or more of the gantries 201 may include one or more personnel platforms 500, one or more of which may be movable along the length of the crossbeam 300 to position the personnel platform 500 in relatively close proximity to the aircraft surface 102 to be worked on. In some examples, the personnel platform 500 may be pivoted about a platform pivot axis 506 (FIG. 17) to allow a forward edge of the personnel platform 500 to be aligned with the exterior surface 102 being worked on and thereby improve access by technicians to the exterior surfaces 102 for manually performing one or more operations. The method may also include deploying one or more side extensions (FIG. 17) and/or moving a platform extension (FIG. 17) to adjust the area of the personnel platform 500 and/or to extend the length of the personnel platform 500 and thereby improve technician access to exterior surfaces 102 of the aircraft 100.

Figure 30:
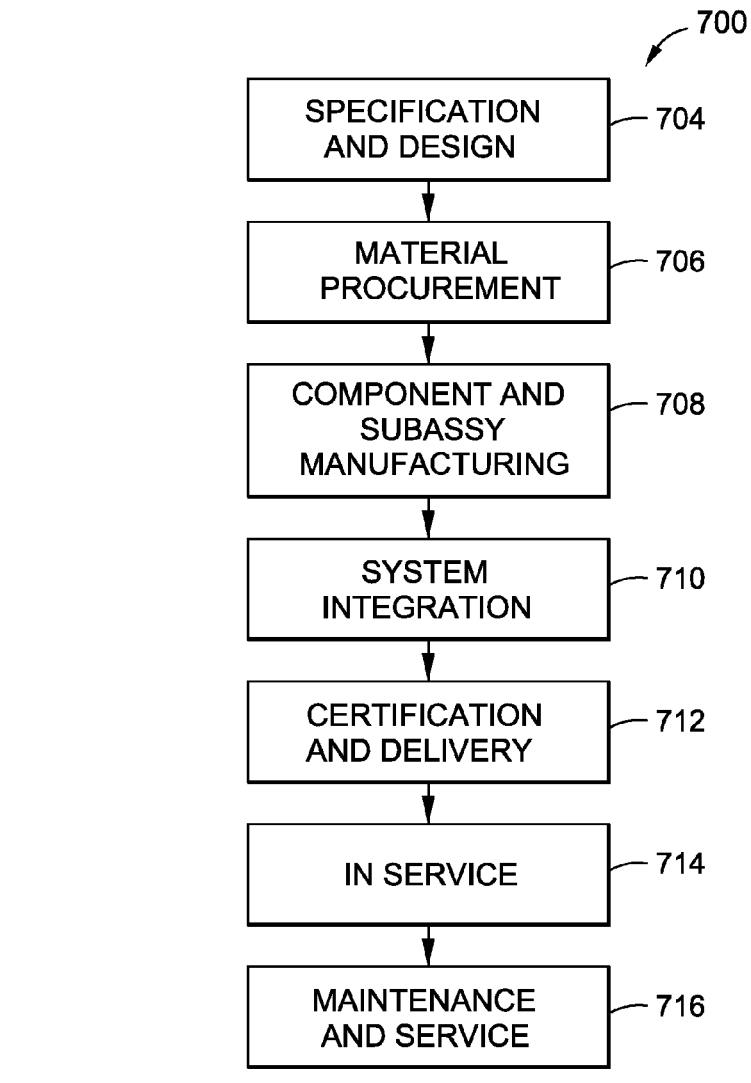
FIG. 30 is a flow diagram of an aircraft production and service methodology.
Figure 31:
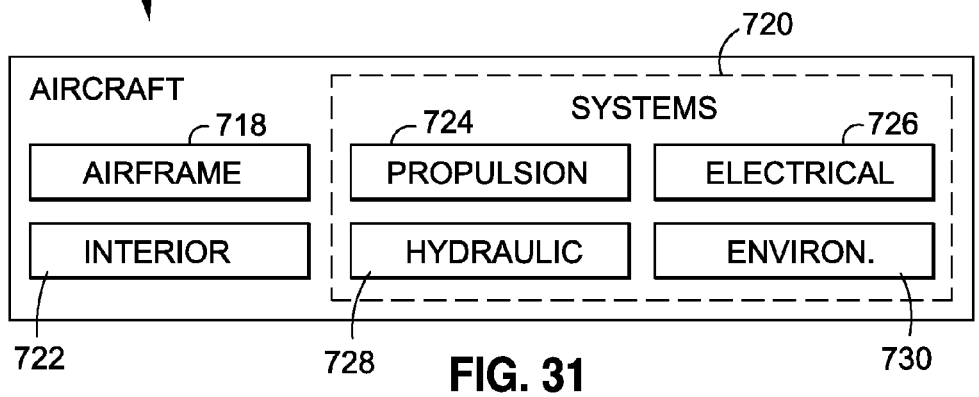
FIG. 31 is a block diagram of an aircraft.

Referring to FIGS. 30-31, embodiments of the disclosure may be described in the context of an aircraft manufacturing and service method 700 as shown in FIG. 30 and an aircraft 702 as shown in FIG. 31. During pre-production, exemplary method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716 (which may also include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 31, the aircraft 702 produced by exemplary method 700 may include an airframe 718 with a plurality of systems 720 and an interior 722. Examples of high-level systems 720 include one or more of a propulsion system 724, an electrical system 726, a hydraulic system 728, and an environmental system 730. Any number of other systems may be included. Although an aerospace example is shown, the principles of the disclosed embodiments may be applied to other industries, such as the automotive industry.

The system and methods embodied herein may be employed during any one or more of the stages of the production and service method 700. For example, components or subassemblies corresponding to production process 708 may be fabricated or manufactured in a manner similar to components or subassemblies produced while the aircraft 702 is in service. Also, one or more apparatus embodiments, system embodiments, method embodiments, or combinations thereof may be utilized during the production stages 708 and 710, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 716.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A coating application system, comprising:
   a gantry, including:
   a pair of towers movable along a respective pair of floor tracks;
   a crossbeam extending between the pair of towers and having opposing beam ends;
   a universal joint coupling each beam end to one tower of the pair of towers and allowing the crossbeam to rotate about a vertical axis of the universal joint and about a horizontal axis of the universal joint;
   a robotic device haring a robot base mounted to the crossbeam via robot base guide rails configured to allow the robot base to travel beyond an outboard side of at least one tower of the pair of towers along a direction toward a pair of towers of an adjacent gantry; and
   the robotic device including an end effector for performing one or more operations on an aircraft exterior surface.

2. The coating application system of claim 1, wherein:
   the crossbeam is vertically movable relative to the pair of towers.

3. The coating application system of claim 1, further including:
   a personnel platform movable along the crossbeam and configured to support one or more personnel.

4. The coating application system of claim 3, further including:
   a controller configured to control accelerations of the robotic device during movement along the crossbeam in a manner counteracting accelerations of the personnel platform during movement along the crossbeam.

5. The coating application system of claim 1, wherein:
   each one of the pair of towers includes a motorized base configured to move the pair of towers in synchronization with one another along the floor tracks.

6. The coating application system of claim 1, wherein:
   each one of the pair of towers is engaged to a floor track in such a manner positively maintaining the tower in a substantially vertical orientation.

7. The coating application system of claim 1, further including:
   a turntable associated with one of the floor tracks and allowing one of the pair of towers to rotate about a tower axis; and
   a curved track section associated with a remaining one of the floor tracks and allowing movement of a remaining one of the pair of towers along an arc having a center of curvature located at the tower axis such that the crossbeam is pivoted about the tower axis.

8. A coating application system for coating an exterior surface of an aircraft, comprising:

at least one gantry, including:
  a first and second tower movable along a respective first and second floor track, the first and second floor track each including a straight track section oriented parallel to one another;
  a crossbeam extending between the first and second tower;
  at least one robotic device having an end effector configured to perform an operation on an aircraft exterior surface;
  a turntable located at an outboard end of the straight track section of the first floor track and configured to rotate the first tower about a first tower axis; and
  a curved track section extending from an outboard end of the straight track section of the second floor track and allowing the second tower to move along an arc of the curved track section having a center of curvature located at the first tower axis such that the crossbeam may pivot about the first tower axis.

9. The coating application system of claim 8, wherein:
  the crossbeam includes an opposing pair of beam ends respectively coupled to the first and second tower by a universal joint; and
  each universal joint allowing the crossbeam to rotate about a vertical axis of the universal joint and about a horizontal axis of the universal joint.

10. The coating application system of claim 8, wherein: the crossbeam is vertically movable relative to the first and second tower.

11. The coating application system of claim 8, further comprising:
  a personnel platform movable along a lengthwise direction of the crossbeam.

12. The coating application system of claim 11, further including:
  a controller configured to control accelerations of the robotic device during movement along the crossbeam in a manner counteracting accelerations of the personnel platform during movement along the crossbeam.

13. The coating application system of claim 8, including:
  three pairs of gantries including a pair of forward gantries, a pair of center gantries, and a pair of aft gantries;
  the gantries of each pair being movable in opposing relation to one another along respective floor tracks and allowing for positioning an aircraft between each pair of gantries; and
  each one of the center gantries having a tower rotatable on a turntable and an opposing tower movable along a curved track section in such a manner to allow the crossbeam of each center gantry to pivot about a tower axis.

14. A coating application method for an aircraft, comprising:
  positioning a gantry relative to an aircraft, the gantry having a crossbeam extending between a pair of towers engaged to respective floor track;
  moving the pair of towers in a synchronous manner along the floor tracks in a direction non-parallel to a longitudinal axis of the aircraft;
  moving a robotic device along robot base guide rails mounted to the crossbeam, the robot base guide rails configured to allow a robot base of the robotic device to travel beyond an outboard side of at least one tower of the pair of towers along a direction toward a pair of towers of an adjacent gantry; and
  performing, using an end effector of the robotic device, an operation on an aircraft exterior surface.

15. The method of claim 14, wherein the step of performing the operation on the aircraft exterior surface comprises:
  manually performing an operation on an aircraft exterior surface using a personnel platform mounted to the crossbeam.

16. The method of claim 14, wherein the step of performing the operation on the aircraft exterior surface includes at least one of sanding, cleaning, coating, and inspecting the aircraft exterior surface.

17. The method of claim 14, further comprising:
  rotating the robot base and/or manipulating at least one arm of the robotic device to position the end effector relative to the aircraft exterior surface.

18. The method of claim 14, further including at least one of the following:
  moving the robotic device along a lengthwise direction of the crossbeam; and
  moving the crossbeam vertically relative to the towers.

19. The method of claim 14, wherein the crossbeam includes opposing beam ends, each beam end being coupled to a tower by a universal joint, the method further comprising at least one of the following:
  allowing the crossbeam to rotate about a vertical axis of the universal joint about a beam end when one tower lags behind an opposite tower during horizontal movement of the towers along the floor tracks; and
  allowing the crossbeam to rotate about a horizontal axis of the universal joint about a beam end when one beam end lags behind an opposite beam end during vertical movement of the crossbeam relative to the towers.

20. The method of claim 14, wherein a personnel platform is movable along a lengthwise direction of the crossbeam, the method further comprising:
  controlling accelerations of the robotic device along the crossbeam in a manner counteracting accelerations of the personnel platform; and
  reducing acceleration-induced lateral loads on the towers by controlling accelerations of the robotic device.

21. The method of claim 14, wherein the pair of towers include a first tower and a second tower movable along a first floor track and a second floor track, the method further comprising:
  rotating the first tower about a first tower axis using a turntable associated with an outboard end of the first track; and
  moving the second tower along a curved track section extending from an outboard end of the second track to rotate the crossbeam relative to a wingtip of the aircraft, the curved track section having a center of curvature located at the first tower axis.

* * * * *